(12) United States Patent
Seshita et al.

(10) Patent No.: US 11,200,675 B2
(45) Date of Patent: Dec. 14, 2021

(54) IMAGE PROCESSING APPARATUS AND IMAGE PROCESSING METHOD

(71) Applicant: SONY CORPORATION, Tokyo (JP)

(72) Inventors: Yusuke Seshita, Tokyo (JP); Goh Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/483,288

(22) PCT Filed: Feb. 6, 2018

(86) PCT No.: PCT/JP2018/003895
§ 371 (c)(1),
(2) Date: Aug. 2, 2019

(87) PCT Pub. No.: WO2018/150933
PCT Pub. Date: Aug. 23, 2018

(65) Prior Publication Data
US 2020/0013168 A1 Jan. 9, 2020

(30) Foreign Application Priority Data
Feb. 20, 2017 (JP) .............................. JP2017-028723

(51) Int. Cl.
*G06T 7/11* (2017.01)
*G06T 3/40* (2006.01)
(Continued)

(52) U.S. Cl.
CPC .................. *G06T 7/11* (2017.01); *G06T 3/40* (2013.01); *G06T 9/001* (2013.01); *G06T 15/205* (2013.01); *G06T 2207/20021* (2013.01)

(58) Field of Classification Search
CPC ... G06T 7/11; G06T 7/194; G06T 3/40; G06T 9/001; G06T 15/20; G06T 15/205;
(Continued)

(56) References Cited

U.S. PATENT DOCUMENTS

2010/0315414 A1* 12/2010 Lowe ..................... G09G 3/003
345/419
2011/0273451 A1* 11/2011 Salemann ............... G06T 15/20
345/427
(Continued)

FOREIGN PATENT DOCUMENTS

| CN | 102291519 A | 12/2011 |
| CN | 103428421 A | 12/2013 |
| JP | 2009539155 A * | 11/2009 ............. G06T 7/002 |

OTHER PUBLICATIONS

Moezzi et al., Virtual View Generation for 3D Digital Video, Immersive Telepresence, IEEE MultiMedia, Jan.-Mar. 1997, pp. 18-26, IEEE.

*Primary Examiner* — Matthew C Bella
*Assistant Examiner* — Kathleen M Broughton
(74) *Attorney, Agent, or Firm* — Paratus Law Group, PLLC

(57) ABSTRACT

There is provided an image processing apparatus and an image processing method that make it possible to reduce the transmission amount of data. The image processing apparatus includes a segmentation section configured to generate, for a plurality of point-of-view images of an object from a plurality of points of view, a plurality of segmentation images each of which is narrowed to a region that includes the object. The present technology can be applied to an encoding device, a decoding device and so forth of a system that performs generation and display of a bird view video, for example, on the basis of a plurality of point-of-view images captured from a plurality of points of view or a plurality of point-of-view images that are CG images from a plurality of points of view.

16 Claims, 29 Drawing Sheets

(51) Int. Cl.
*G06T 9/00* (2006.01)
*G06T 15/20* (2011.01)

(58) Field of Classification Search
CPC . G06T 2207/20021; G06T 2207/10024; G06T 2207/10028; G06T 2207/20224; G06T 17/00; H04N 19/85; H04N 19/167; H04N 19/597; H04N 21/234; H04N 13/178; H04N 13/117; H04N 13/111; H04N 13/282; H04N 13/161

See application file for complete search history.

(56) References Cited

U.S. PATENT DOCUMENTS

| | | | |
|---|---|---|---|
| 2012/0287247 A1* | 11/2012 | Stenger | H04N 13/254 |
| | | | 348/47 |
| 2013/0155058 A1* | 6/2013 | Golparvar-Fard | G06T 17/00 |
| | | | 345/419 |
| 2013/0188024 A1* | 7/2013 | Givon | H04N 13/204 |
| | | | 348/49 |
| 2016/0364878 A1* | 12/2016 | Guo | G06T 7/11 |
| 2017/0004649 A1* | 1/2017 | Collet Romea | G06T 17/00 |

* cited by examiner

FIG. 3
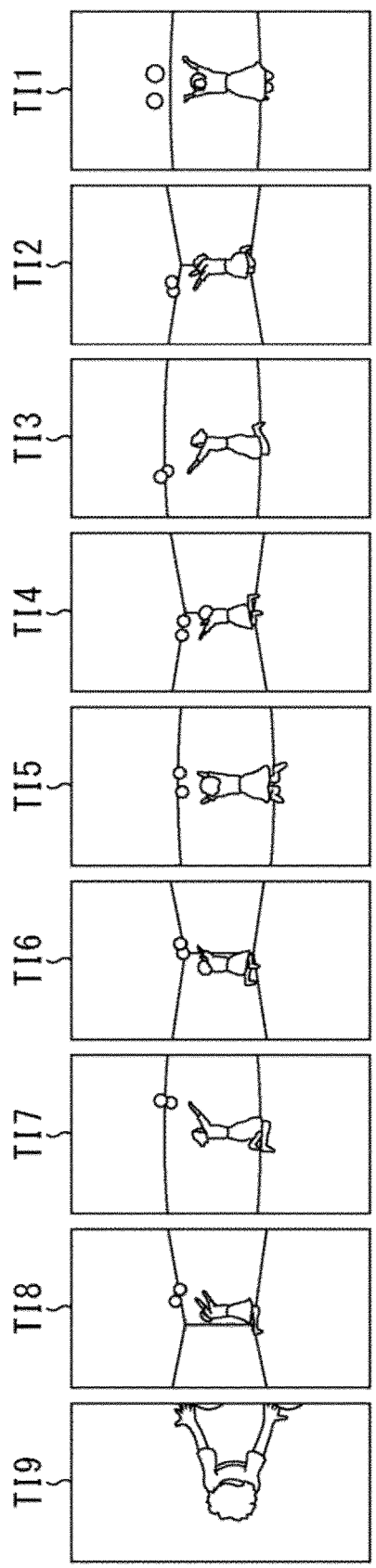
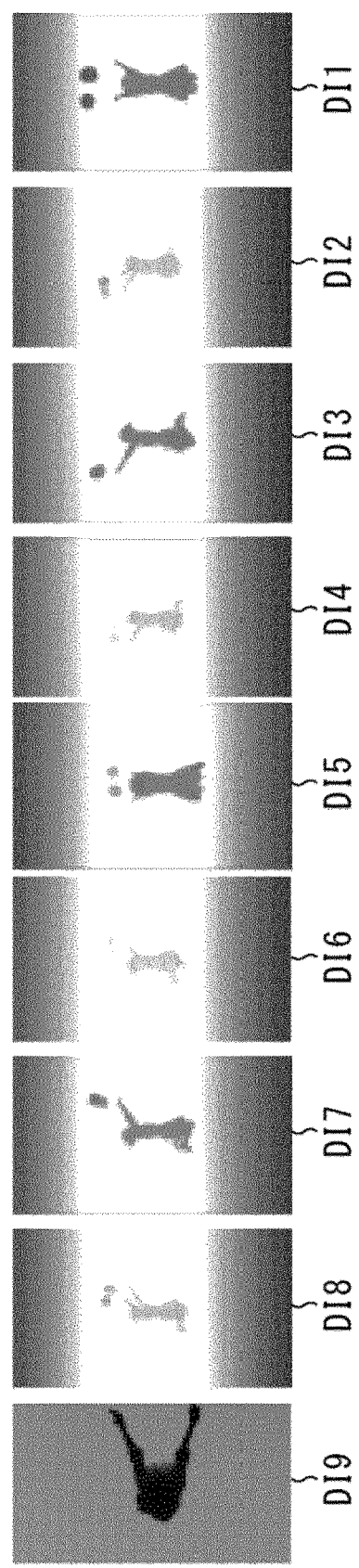

FIG.11
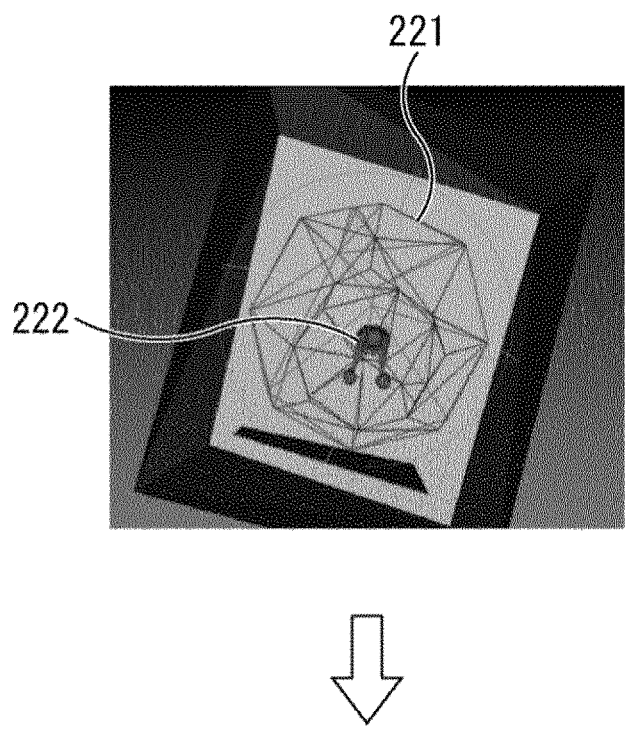
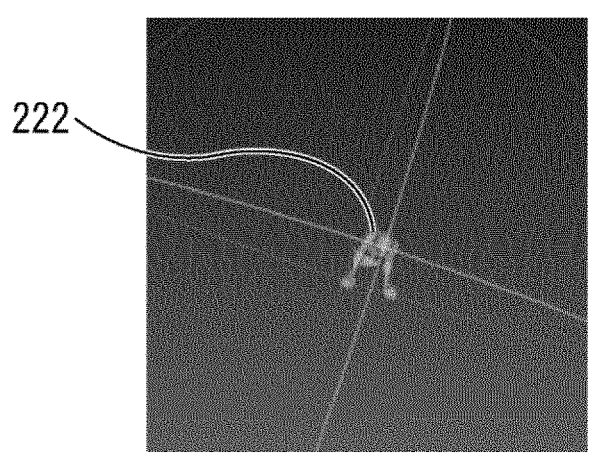

```
<crop_info>
    <normOffsetX>0.05</normOffset>
    <occupancyX>0.5</occupancyX>
    <normOffsetY>0.01</normOffsetY>
    <occupancyY>0.5</occupancyY>
</crop_info>
```

FIG.23

```
<crop_info>
    <normOffsetX>0.33</normOffset>
    <occupancyX>0.33</occupancyX>
    <normOffsetY>0.8</normOffsetY>
    <occupancyY>0.2</occupancyY>
</crop_info>
<camera_id>1</crop_info>
```

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2018/003895 (filed on Feb. 6, 2018) under 35 U.S.C. § 371, which claims priority to Japanese Patent Application No. 2017-028723 (filed on Feb. 20, 2017), which are all hereby incorporated by reference in their entirety.

TECHNICAL FIELD

The present technology relates to an image processing apparatus and an image processing method, and particularly relates to an image processing apparatus and an image processing method suitable for use in the case where a virtual image of an object from a virtual point of view is generated on the basis of a plurality of point-of-view images of the object from a plurality of points of view.

BACKGROUND ART

There is a technology for generating a 3D model of an imaging object from a texture image and a depth image captured by a plurality of imaging cameras (for example, refer to NPL 1).

CITATION LIST

Non Patent Literature

[NPL 1]
Saied Moezzi, Li-Cheng Tai, Philippe Gerard, "Virtual View Generation for 3D Digital Video," University of California, San Diego

SUMMARY

Technical Problem

However, in NPL 1, it has not been considered to reduce, in the case where a virtual image of an object from a virtual point of view is to be generated on the basis of a plurality of point-of-view images of the object from a plurality of points of view, the transmission amount of data between the side from which a point-of-view image is to supplied and the side by which a virtual image is to be generated.

The present technology has been made in view of such a situation as just described and makes it possible to reduce the transmission amount of data.

Solution to Problem

An image processing apparatus of a first aspect of the present technology includes a segmentation section configured to generate, for a plurality of point-of-view images of an object from a plurality of points of view, a plurality of segmentation images each of which is narrowed to a region that includes the object.

The segmentation images can be used for generation of a virtual image that is an image of the object from a virtual point of view.

The image processing apparatus can further include a selection section configured to select a plurality of reproducing images to be used for generation of the virtual image from among a plurality of the segmentation images.

The image processing apparatus can further include a packing section configured to generate a packing image by uniting a plurality of the reproducing images into one image.

The image processing apparatus can be configured such that the packing section maps the reproducing images to a plurality of packing regions into which a region of a rectangular shape same as that of the packing image are divided and scales the reproducing images individually in accordance with a size of the packing regions.

The image processing apparatus can be configured such that the packing section selects the packing region to which each of the reproducing images is to be mapped based on importance degrees of the reproducing images.

The image processing apparatus can be configured such that the packing section generates metadata indicative of a position to which each of the reproducing images is mapped.

The image processing apparatus can further include an encoding section configured to encode the packing image.

The image processing apparatus can be configured such that the selection section performs selection of the reproducing image based on a relative relationship in at least one of a position or a direction between each of the plurality of points of view and the virtual point of view.

The image processing apparatus can be configured such that the selection section performs the selection of the reproducing image further based on a substance of the segmentation images.

The image processing apparatus can be configured such that it further includes a selection section configured to select the plurality of point-of-view images to be used for generation of the virtual image from among a plurality of the point-of-view images, and the segmentation section generates the segmentation image from each of the selected point-of-view images.

The image processing apparatus can further include a packing section configured to generate a packing image by uniting a plurality of the segmentation images into one image.

The image processing apparatus can be configured such that the segmentation section generates metadata indicative of the position of a region used in each of the segmentation images in each of the point-of-view images.

The image processing apparatus can be configured such that the segmentation section sets a region to be used for the segmentation image based on a region in which a 3D model or a three-dimensional space including the object in a 3D model generated from a plurality of the point-of-view images is projected to a coordinate system of each of the point-of-view images.

The image processing apparatus can be configured such that the segmentation section sets, for each of the plurality of points of view, a common region in which the object is included in a plurality of frames as a region to be used for the segmentation image.

The image processing apparatus can be configured such that each of the point-of-view images includes a texture image and a depth image, and each of the segmentation images includes an image generated from the texture image and an image generated from the depth images.

The image processing apparatus can be configured such that the point-of-view images include images captured from the plurality of points of view by a plurality of imaging devices.

An image processing method of the first aspect of the present technology includes a segmentation step of generating, for a plurality of point-of-view images of an object from a plurality of points of view, a plurality of segmentation images each of which is narrowed to a region that includes the object.

An image processing apparatus of a second aspect of the present technology includes a drawing section configured to generate, for a plurality of point-of-view images of an object from a plurality of points of view, a virtual image that is an image of the object from a virtual point of view based on a plurality of segmentation images each of which is narrowed to a region that includes an object.

An image processing method of the second aspect of the present technology includes a drawing step of generating, for a plurality of point-of-view images of an object from a plurality of points of view, a virtual image that is an image of the object from a virtual point of view based on a plurality of segmentation images each of which is narrowed to a region that includes an object.

In the first aspect of the present technology, for a plurality of point-of-view images of an object from a plurality of points of view, a plurality of segmentation images each of which is narrowed to a region that includes the object are generated.

In the second aspect of the present technology, for a plurality of point-of-view images of an object from a plurality of points of view, a virtual image that is an image of the object from a virtual point of view is generated based on a plurality of segmentation images each of which is narrowed to a region that includes an object.

It is to be noted that the image processing apparatus of the first aspect and the second aspect can be implemented by causing a computer to execute a program.

Further, the program for being executed by a computer in order to implement the image processing apparatus of the first aspect and the second aspect can be provided by transmission through a transmission medium or as a recording medium on which the program is recorded.

Advantageous Effect of Invention

With the first aspect or the second aspect of the present technology, the transmission amount of data can be reduced.

It is to be noted that the advantageous effect described here is not necessarily restrictive and may be some advantageous effects described in the present disclosure.

BRIEF DESCRIPTION OF DRAWINGS

FIG. 3 is a view depicting an example of a texture image and a depth image.

FIG. 11 is a view illustrating the second example of the extraction method of a foreground 3D model or a foreground space.

FIG. 23 is a view depicting a particular example of packing region metadata.

DESCRIPTION OF EMBODIMENT

In the following, a mode for carrying out the present technology (hereinafter referred to as embodiment) is described. It is to be noted that the description is given in the following order.

1. Embodiment
2. Modifications
3. Application Examples

1. Embodiment

Configuration Example of Image Processing System

Figure 1:
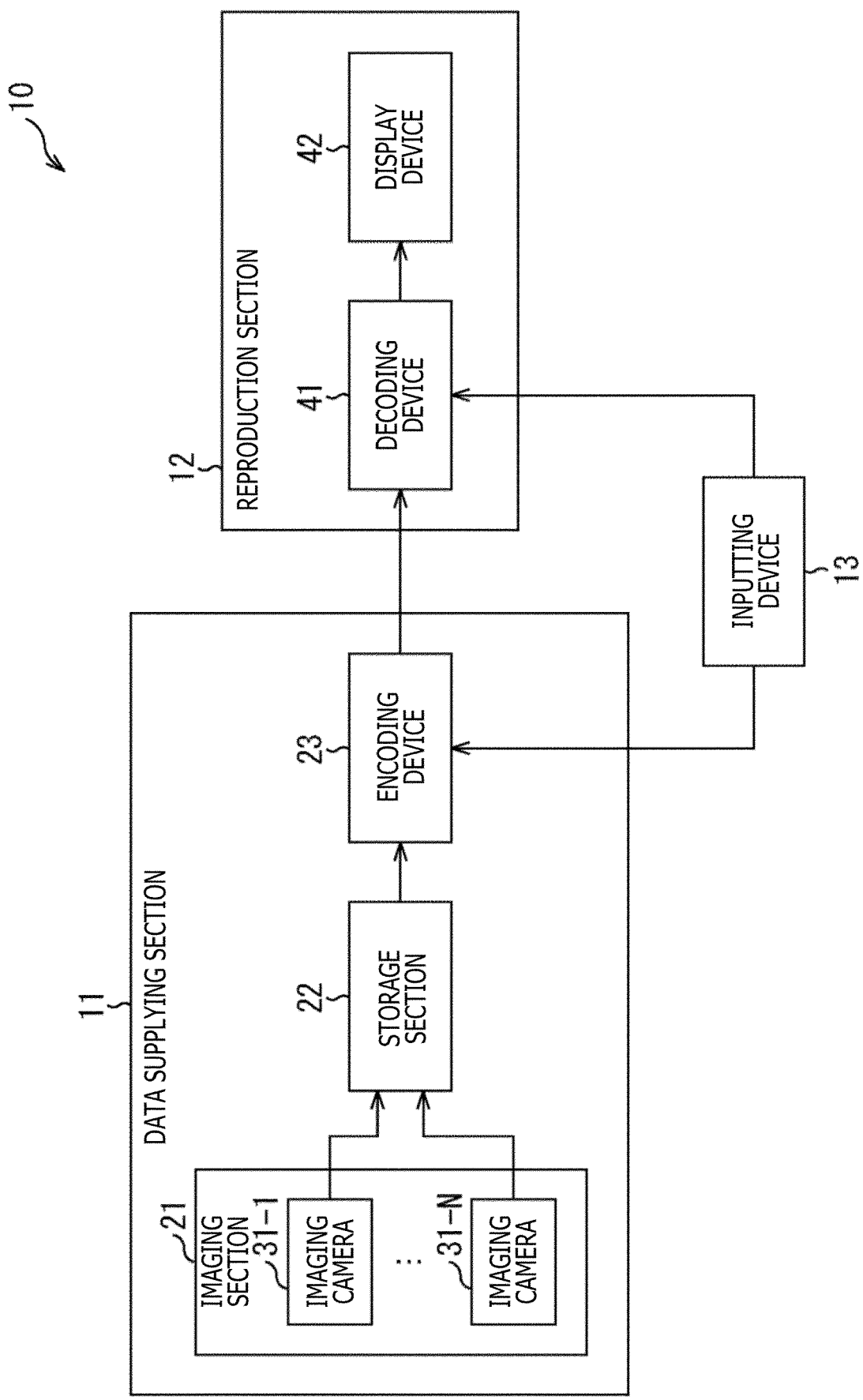
FIG. 1 is a block diagram depicting a configuration example of an embodiment of an image processing system to which the present technology is applied.

FIG. 1 is a block diagram depicting a configuration example of an embodiment of an image processing system to which the present technology is applied.

An image processing system 10 of FIG. 1 is a system in which a virtual image of an object from an arbitrary virtual point of view is generated and displayed on the basis of point-of-view images captured from a plurality of real points of view surrounding at least part of the object. In particular, the image processing system 10 performs generation, displaying and so forth of a video of a bird view.

The image processing system 10 includes a data supplying section 11, a reproduction section 12, and an inputting device 13. The data supplying section 11 includes an imaging section 21, a storage section 22, and an encoding device 23. The reproduction section 12 includes a decoding device 41 and a display device 42.

The imaging section 21 includes a plurality of imaging cameras 31-1 to 31-N. It is to be noted that, where there is no necessity to distinguish the imaging cameras 31-1 to 31-N individually, the imaging cameras 31-1 to 31-N are each referred to simply as imaging camera 31.

The imaging cameras 31 are disposed so as to surround at least part of an object that is a display target by the reproduction section 12 and capture moving images of texture images of the object from a plurality of real points of view different from each other. Further, the imaging cameras 31 individually include a distance measuring instrument (not depicted) and generate moving images of depth images from the same points of view as those of the texture images. The imaging cameras 31 store the texture images and the depth images into the storage section 22.

The encoding device 23 generates an encoded stream obtained by encoding the texture images and the depth images stored in the storage section 22 and supplies the encoded stream to the decoding device 41 of the reproduction section 12. Further, as hereinafter described, the encoding device 23 segments an image within a necessary region from the texture images and the depth images and selects the texture image and the depth image to be supplied to the reproduction section 12 on the basis of camera parameters of a virtual camera (virtual point of view) inputted from the inputting device 13 such that the transmission amount of data between the data supplying section 11 and the reproduction section 12 is reduced.

The decoding device 41 decodes the encoded stream and generates a display image (virtual image) that is an image of the object from the virtual point of view on the basis of the camera parameters of the virtual camera (virtual point of view) inputted from the inputting device 13, and then supplies the decoded stream and the display image to the display device 42.

The display device 42 is configured, for example, from a two-dimensional head-mounted display (HMD) or a two-dimensional monitor. The display device 42 two-dimensionally displays the display image supplied from the decoding device 41.

The inputting device 13 is used to input a virtual point of view with regard to which an object is to be displayed on the display device 42. The inputting device 13 supplies camera parameters of a virtual camera representing the inputted virtual point of view to the encoding device 23 and the decoding device 41.

Configuration Example of Imaging Section

Figure 2:
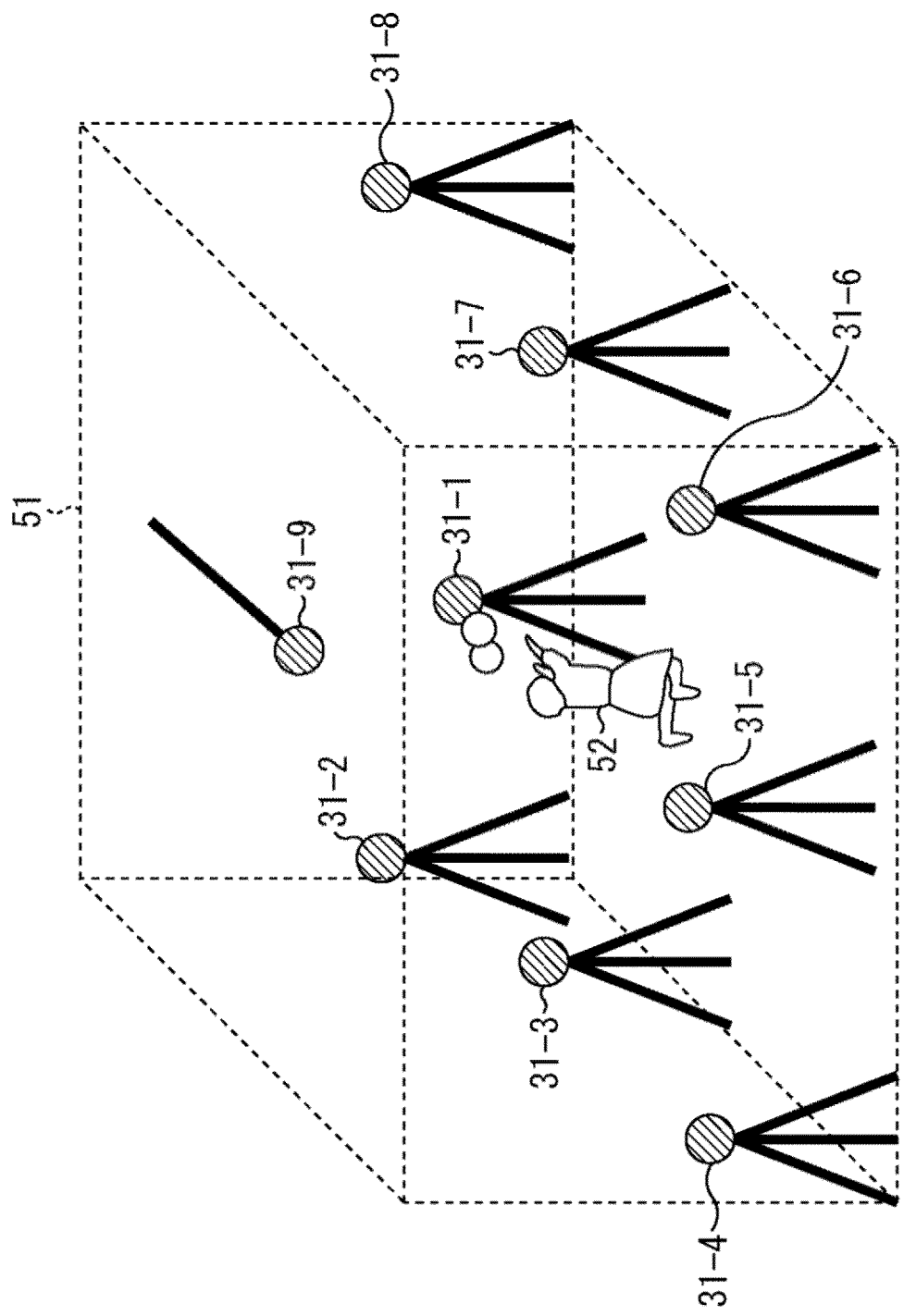
FIG. 2 is a view depicting a configuration example of an imaging section.

FIG. 2 schematically depicts a configuration example of the imaging section 21. In this example, the imaging section 21 is configured from nine imaging cameras 31-1 to 31-9 disposed in a room 51. It is to be noted, in FIG. 2, the position of each imaging camera 31 is indicated by a round mark to which a pattern of slanting lines is applied. Further, in this example, an object 52 including a person and two balls exists at a substantially central position of the room.

The imaging cameras 31-1 to 31-8 are disposed so as to surround a periphery in the room 51. In particular, the imaging camera 31-1, the imaging camera 31-3, the imaging camera 31-5, and the imaging camera 31-7 are disposed so as to be directed almost to the center of the room 51 from substantially central positions of individual walls of the room 51. The imaging camera 31-1 and the imaging camera 31-5, and the imaging camera 31-3 and the imaging camera 31-7, are opposed to each other. The imaging camera 31-2, the imaging camera 31-4, the imaging camera 31-6, and the imaging camera 31-8 are disposed so as to be directed almost to the center of the room 51 from the individual corners of the room 51. The imaging camera 31-2 and imaging camera 31-6, and the imaging camera 31-4 and imaging camera 31-8, are opposed to each other. The imaging camera 31-9 is disposed so as to look down almost to the center of the room 51 from a substantially central portion of the ceiling of the room 51. Thus, by the imaging cameras 31-1 to 31-9, an object in the room 51 (for example, an object 52) can be imaged in such a manner as to surround from different points of view (real points of view).

FIG. 3 depicts an example of point-of-view images (texture images and depth images) obtained by imaging the object 52 by the imaging cameras 31-1 to 31-9. Texture images TI1 to TI9 depict an example of texture images captured by the imaging cameras 31-1 to 31-9, respectively. Depth images DI1 to DI9 depict an example of depth images captured by the imaging cameras 31-1 to 31-9. In this manner, the texture images and the depth images of the object 52 as viewed from points of view different from each other are obtained at the substantially same time.

Configuration Example of Encoding Device

Figure 4:
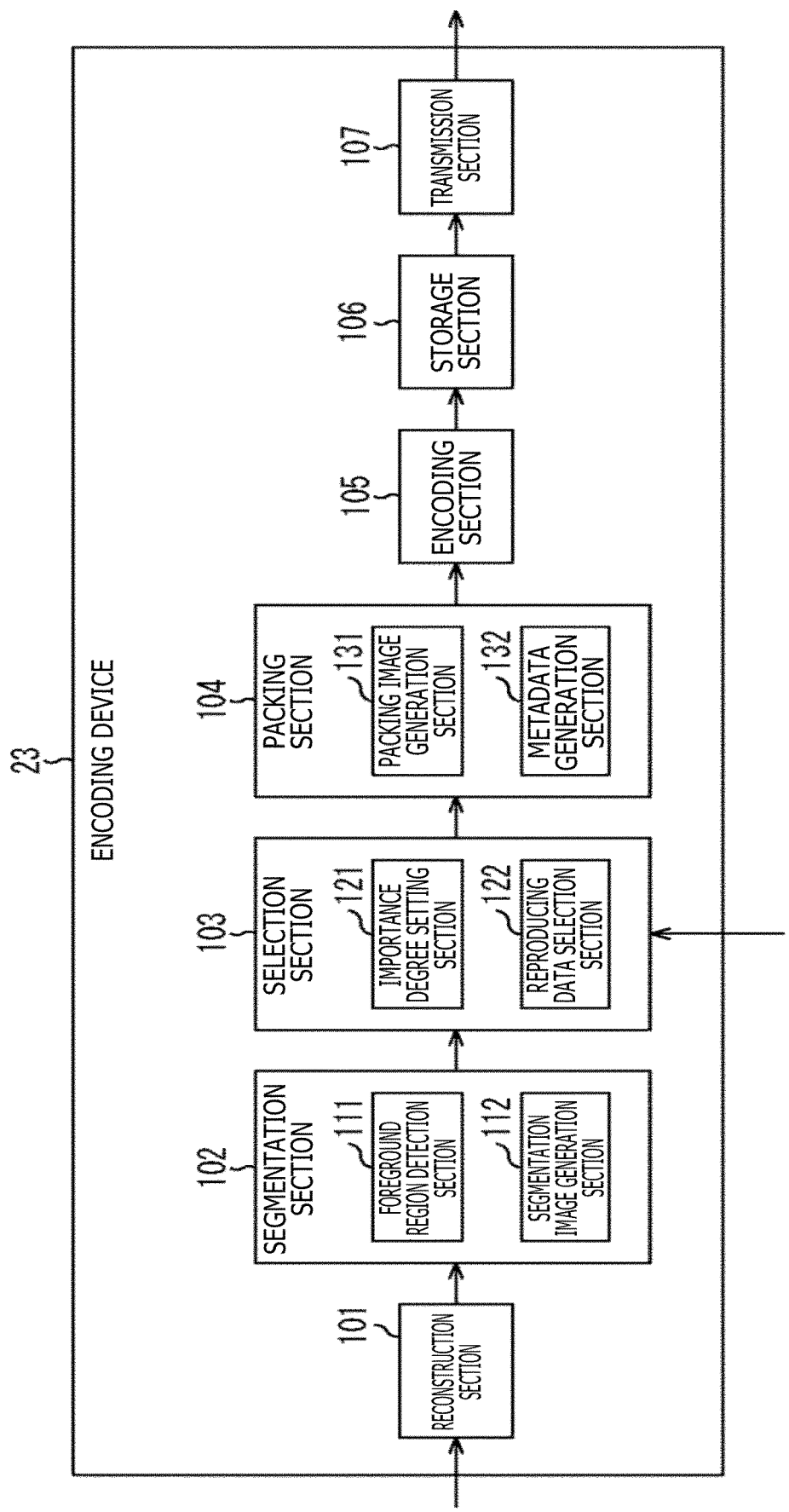
FIG. 4 is a view depicting a configuration example of an encoding device.

FIG. 4 is a block diagram depicting a configuration example of the encoding device 23.

The encoding device 23 includes a reconstruction section 101, a segmentation section 102, a selection section 103, a packing section 104, an encoding section 105, a storage section 106, and a transmission section 107.

The reconstruction section 101 generates a 3D model of an imaging object including the foreground and the background using the texture images and the depth images of the imaging cameras 31 stored in the storage section 22 and the camera parameters of the imaging cameras 31. Further, the reconstruction section 101 generates 3D data representative of the generated 3D model. The reconstruction section 101 supplies the 3D data and texture images and the depth images of the imaging cameras 31 and camera parameters of the imaging cameras 31 used for generation of the 3D data to the segmentation section 102.

It is to be noted that, in the following description, a camera parameter of an imaging camera 31 used for imaging of a texture images and a depth images is sometimes referred to simply as camera parameter of the texture images and the depth images.

The segmentation section 102 segments an image of a segmentation region including an object that is a display target in the reproduction section 12 from the texture images and the depth images of the imaging cameras 31 to generate segmentation texture images and depth images. Here, segmentation of an image signifies to cut out part of an image, for example, to cut out a necessary portion of an image and is referred to also as clopping. The segmentation section 102 includes a foreground region detection section 111 and a segmentation image generation section 112.

The foreground region detection section 111 detects a foreground region including an object that is a display target in the reproduction section 12 in each of a texture image and a depth image on the basis of a 3D model represented by 3D data.

The segmentation image generation section 112 sets a segmentation region in each of a texture image and a depth image on the basis of the detected foreground region. Then, the segmentation image generation section 112 segments an image of the segmentation region from each of the texture image and the depth image to generate a segmentation texture image and a segmentation depth image, respectively. Further, the segmentation image generation section 112 generates segmentation information metadata indicative of the position of the segmentation region of the texture image and the depth image. The segmentation image generation section 112 supplies the segmentation texture images, segmentation depth images, segmentation information metadata and camera parameters of the imaging cameras 31 to the selection section 103.

It is to be noted that, in the following description, in the case where there is no necessity to distinguish a segmentation texture image and a segmentation depth image from each other, each of the segmentation texture image and the segmentation depth image is referred to simply as segmentation image.

The selection section 103 selects reproducing data to be supplied to the reproduction section 12 and used for generation of a display image on the basis of the camera parameters of the imaging cameras 31 and the camera parameters of the virtual camera supplied from the inputting device 13. The selection section 103 includes an importance degree setting section 121, and a reproducing data selection section 122.

The importance degree setting section 121 sets an importance degree of each of the imaging cameras 31 on the basis of the camera parameters of the imaging cameras 31 and the camera parameters of the virtual camera.

The reproducing data selection section 122 selects a segmentation texture image (hereinafter referred to as reproducing texture image) and a segmentation depth image (hereinafter referred to as reproducing depth image) to be supplied to the reproduction section 12 on the basis of the importance degrees of the imaging cameras 31. Further, the reproducing data selection section 122 sets, as importance degrees of the reproducing texture images and the reproducing depth images, importance degrees of the imaging cameras 31 used for capturing the images. The reproducing data selection section 122 supplies the selected reproducing texture images and reproducing depth images, importance degrees of the images, and segmentation information metadata and camera parameters corresponding to the images to the packing section 104.

It is to be noted that, in the following description, in the case where there is no necessity to distinguish a reproducing texture image and a reproducing depth image from each other, each of them is referred to simply as reproducing image.

The packing section 104 performs packing (coupling) of reproducing texture images into one image to generate a packing texture image. Further, the packing section 104 performs packing (coupling) of reproducing depth images into one image to generate a packing depth image. The packing section 104 includes a packing image generation section 131 and a metadata generation section 132.

The packing image generation section 131 sets a packing layout, which is a layout for packing reproducing texture images, while using importance degrees of the reproducing texture images as occasion demands. Then, the packing image generation section 131 generates a packing texture image by mapping reproducing texture images to the packing regions in the packing layout while using the importance degrees of the reproducing texture images as occasion demands. Further, the packing image generation section 131 generates a packing depth image in which reproducing depth images are packed by a similar method. The packing image generation section 131 supplies the packing texture image and the packing depth image as well as segmentation information metadata, packing information metadata (hereinafter described), and camera parameters corresponding to the images to the encoding section 105.

It is to be noted that, in the following description, in the case where there is no necessity to distinguish a packing texture image and a packing depth image from each other, each of them is referred to simply as packing image.

The metadata generation section 132 generates packing information metadata indicative of positions to which reproducing texture images and reproducing depth images are mapped.

The encoding section 105 encodes the packing texture image and the packing depth image. Further, the encoding section 105 generates an encoded stream including the packing texture image and the packing depth image after encoding as well as segmentation information metadata, packing information metadata, and camera parameters corresponding to the images and stores the encoded stream into the storage section 106.

The transmission section 107 transmits the encoded stream stored in the storage section 22 to the decoding device 41 of the reproduction section 12.

Configuration Example of Decoding Device

Figure 5:
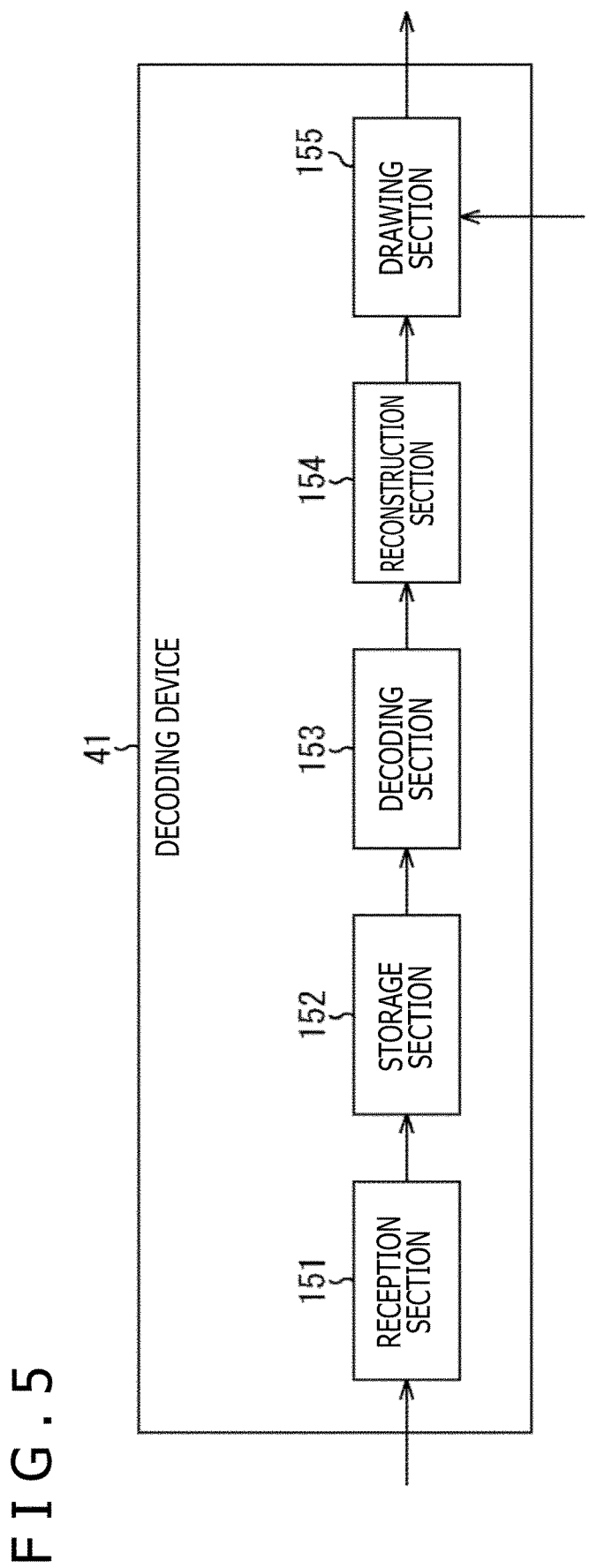
FIG. 5 is a view depicting a configuration example of a decoding device.

FIG. 5 is a block diagram depicting a configuration example of the decoding device 41.

The decoding device 41 includes a reception section 151, a storage section 152, a decoding section 153, a reconstruction section 154, and a drawing section 155.

The reception section 151 receives an encoded stream transmitted from the transmission section 107 of the encoding device 23 and stores the encoded stream into the storage section 152.

The decoding section 153 decodes the encoded stream stored in the storage section 152 by a method corresponding to the encoding method by the encoding section 105 of the encoding device 23. The decoding section 153 separates reproducing texture images packed in the decoded packing texture image on the basis of packing information metadata. Further, the decoding section 153 returns the size of each reproducing texture image into an original one as occasion demands.

Similarly, the decoding section 153 separates the reproducing depth images packed in the decoded packing depth image on the basis of the packing information metadata. Further, the decoding section 153 returns the size of each reproducing depth image into an original one as occasion demands. The decoding section 153 supplies the resulting reproducing texture images and reproducing depth images as well as segmentation information metadata and camera parameters corresponding to the images to the reconstruction section 154.

The reconstruction section 154 generates a 3D model on the basis of the reproducing texture images and the reproducing depth images as well as the segmentation information metadata and the camera parameters corresponding to the images by a method similar to that of the reconstruction section 101 of the encoding device 23. The reconstruction section 154 supplies the generated 3D mode to the drawing section 155.

The drawing section 155 generates a virtual texture image, which is obtained when imaging is performed from the virtual camera, as a display image on the basis of the 3D model supplied from the reconstruction section 154 and the camera parameters of the virtual camera supplied from the inputting device 13. The drawing section 155 supplies the display image to the display device 42.

Description of Processing of Image Processing System

Now, processing of the image processing system 10 is described with reference to FIGS. 6 to 28.

It is to be noted that, in the following description, the ID of the imaging camera 31-$i$ (i=1 to N) is i, and the imaging camera 31-$i$ is suitably referred to as imaging camera i. (Encoding Process)

First, an encoding process executed by the encoding device 23 is described with reference to a flow chart of FIG. 6.

In step S1, the reconstruction section 101 re-constructs a 3D model. In particular, the reconstruction section 101 reads out, from among the texture images and the depth images of the imaging cameras 31 stored in the storage section 22, a texture image and a depth image of a frame that becomes an encoding target from the storage section 22.

Further, the reconstruction section 101 reads out the camera parameters of the imaging cameras 31 from the storage section 22. The camera parameters include, for example, an external parameter and an internal parameter in a world coordinate system (3D coordinate system) and at least includes a position in the world coordinate system and a direction of the optical axis of each imaging camera 31. It is to be noted that, in the case where the position of each imaging camera 31 is fixed, the camera parameters of each imaging camera 31 need not necessarily be read out every time by the process in step S1 but may be read out only once in the beginning.

The reconstruction section 101 calculates Visual Hull and so forth using the read out texture image and depth image as well as the camera parameters corresponding to the images to generate a 3D model of the imaging object including the foreground and the background.

Then, the reconstruction section 101 generates 3D data representative of the 3D model. For example, the reconstruction section 101 generates three-dimensional positions of vertices (Vertex) of polygon meshes configuring the 3D model and shape information (Geometry) indicative of connections between the vertices and color information of the polygon meshes as 3D data of the imaging object.

It is to be noted that the generation method of 3D data is not limited specifically, and, for example, a point cloud, volume data or the like may be used or the method described in NPL 1 mentioned hereinabove or the like may be adopted. Further, for example, the 3D data may be configured from shape information and a texture image of the point of view of each imaging camera 31.

The reconstruction section 101 supplies the generated 3D data, the texture images and the depth images used for generation of the 3D data, and camera parameters corresponding to the images to the segmentation section 102.

In step S2, the segmentation section 102 executes a segmentation process. Here, details of the segmentation process are described with reference to a flow chart of FIG. 7.

In step S51, the foreground region detection section 111 extracts a foreground 3D model or a foreground space. Here, the foreground space is a three-dimensional space including an object existing in front of the background in a 3D model. It is to be noted that the foreground space need not necessarily include all objects existing in front of the background and it is sufficient if the foreground space includes at least an object to be displayed on the reproduction section 12.

Figure 8:
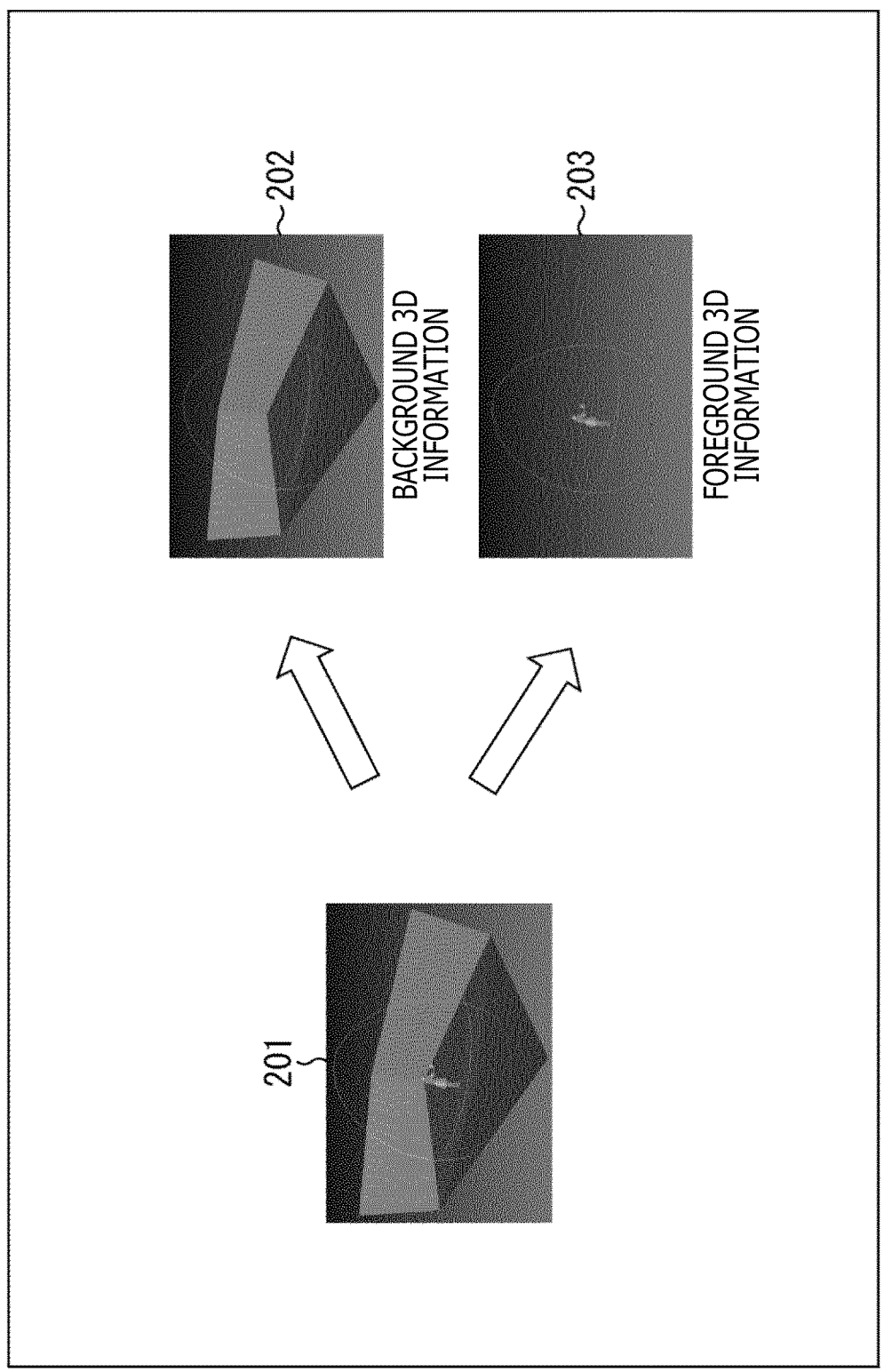
FIG. 8 is a view illustrating a first example of an extraction method of a foreground 3D model or a foreground space.

For example, in the case where information of the foreground and information of the background are separate from each other in 3D data, the foreground region detection section 111 extracts a foreground 3D model or a foreground space on the basis of the information. For example, as depicted in FIG. 8, in the case where 3D data 201 is separated into background 3D information 202 and foreground 3D information 203, the foreground region detection section 111 extracts a foreground 3D model or a foreground space on the basis of the background 3D information 202.

Figure 9:
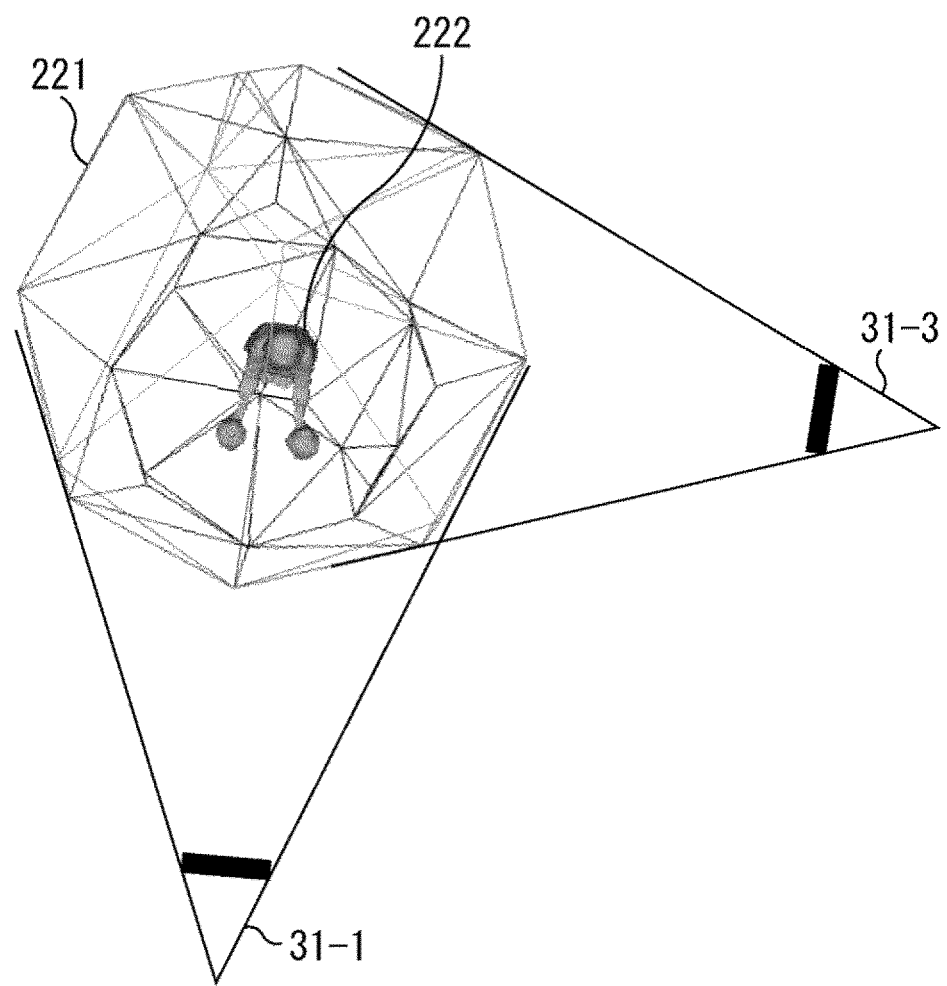
FIG. 9 is a view illustrating a second example of the extraction method of a foreground 3D model or a foreground space.

On the other hand, in the case where the information of the foreground and the information of the background are not separate in the 3D data, the foreground region detection section 111 extracts a foreground 3D model or a foreground space on the basis of other information. For example, as depicted in FIG. 9, the foreground region detection section 111 generates Convex Hull 221 that is the product of spaces in fields of view (imaging ranges) of the imaging cameras 31. It is to be noted that, in FIG. 9, in order to facilitate understandings, only the imaging camera 31-1 and the imaging camera 31-3 are depicted.

Figure 10:
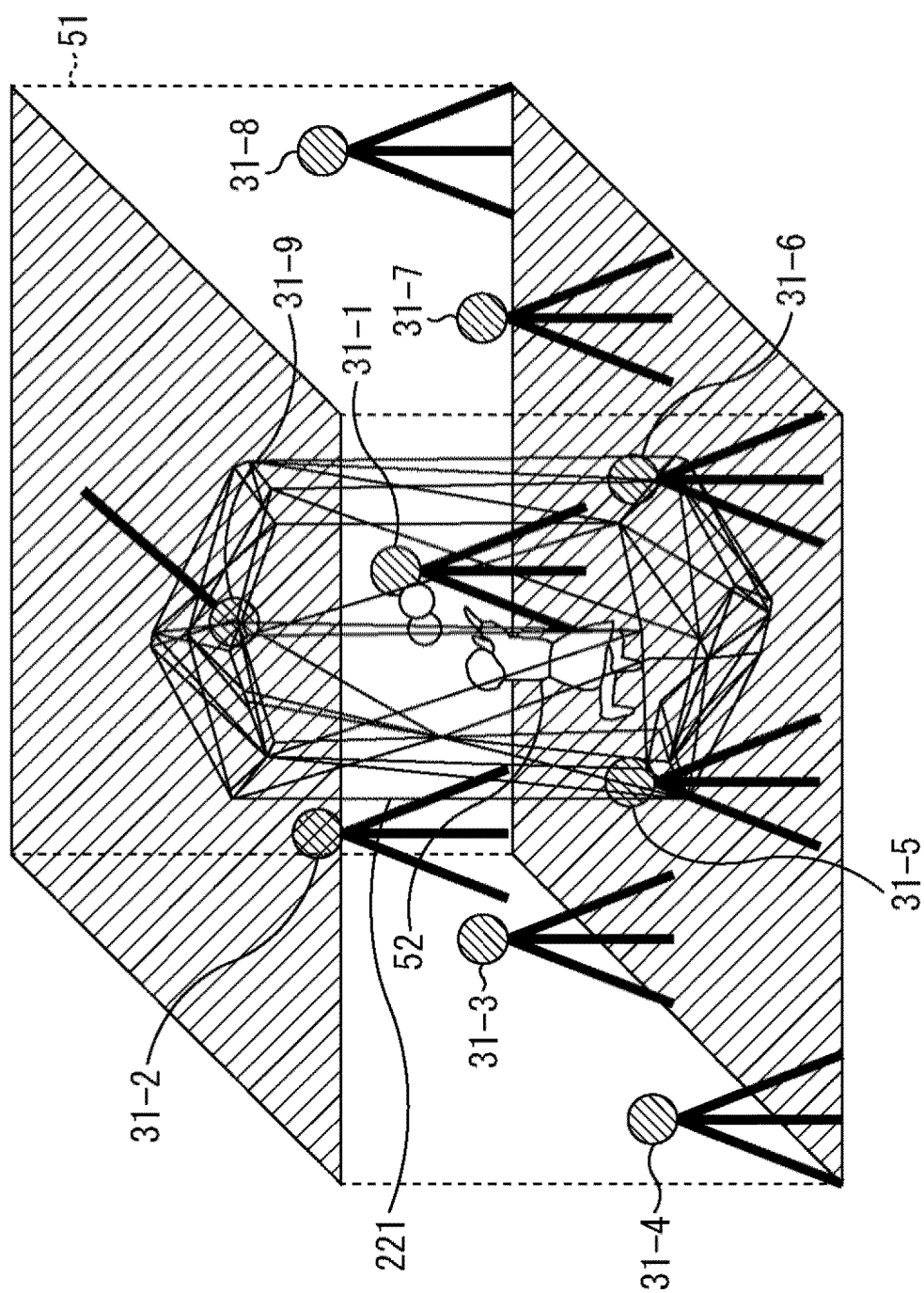
FIG. 10 is a view illustrating the second example of the extraction method of a foreground 3D model or a foreground space.

In this case, the foreground region detection section 111 may restrict the range of the Convex Hull to be generated on the basis of known region information. For example, as depicted in FIG. 10, the foreground region detection section 111 may generate Convex Hull 221 restricting the range of the same to a range of the ceiling and the floor of the room 51.

Then, the foreground region detection section 111 extracts a 3D model in the Convex Hull as a foreground 3D model. For example, as depicted in FIG. 11, a 3D model 222 in the Convex Hull 221 is extracted as a foreground space.

It is to be noted that, in the case where 3D data cannot be utilized, the foreground region detection section 111 may use, for example, a space defined by the Convex Hull as a foreground space.

Figure 12:
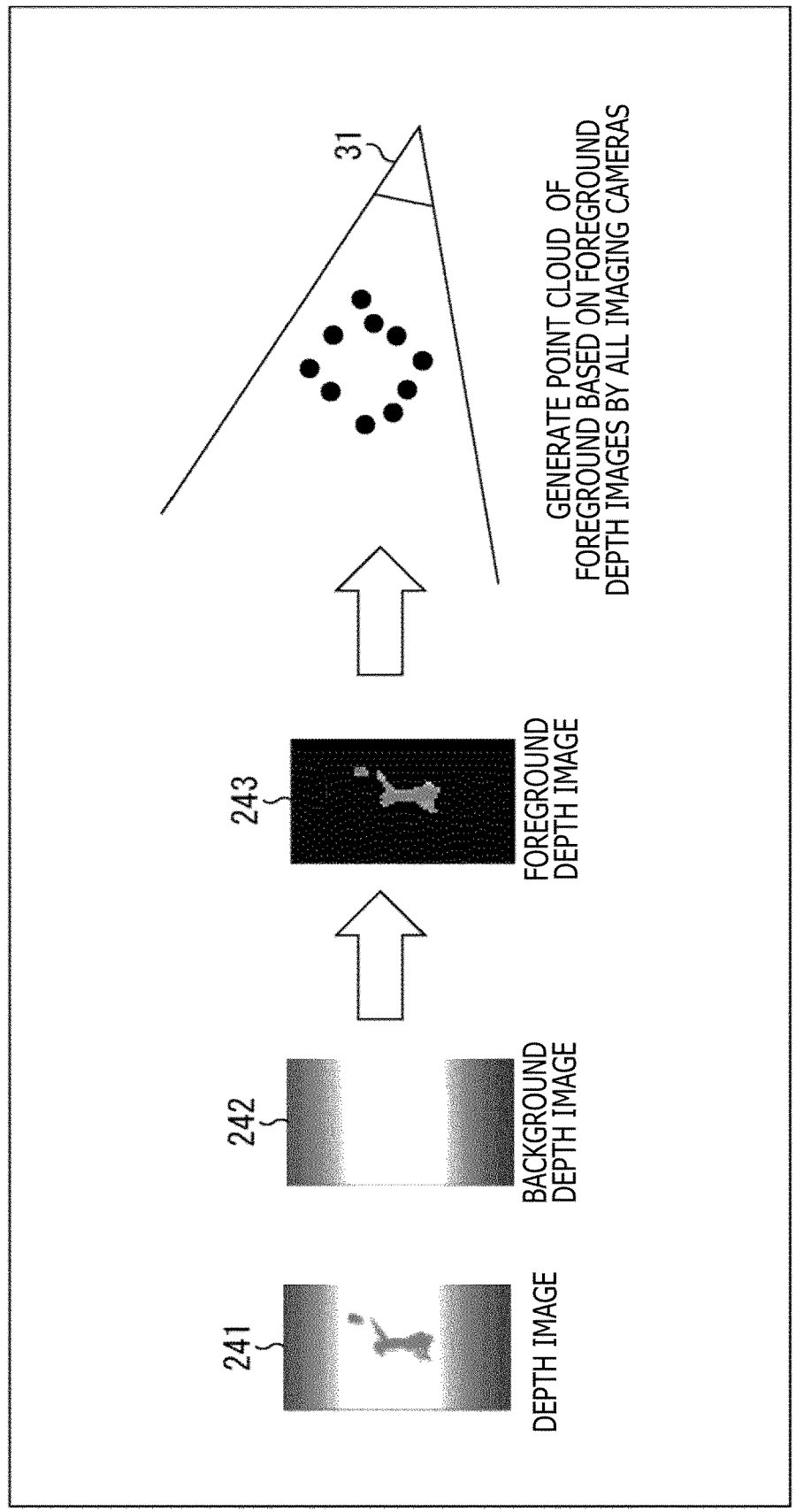
FIG. 12 is a view illustrating a third example of the extraction method of a foreground 3D model or a foreground space.

As an alternative, for example, the foreground region detection section 111 may extract a foreground 3D model or a foreground space on the basis of the depth images of the imaging cameras 31. For example, as depicted in FIG. 12, the foreground region detection section 111 generates a point cloud of the foreground on the basis of depth values indicated by foreground depth images 243 of the imaging cameras 31. Then, the foreground region detection section 111 sets a space based on the generated point cloud of the foreground as a foreground space.

In this case, for example, in the case where a depth image 241 and a background depth image 242 indicative of a depth value of the background are available as depicted in FIG. 12, the foreground region detection section 111 may generate the foreground depth image 243 from the difference between the depth image 241 and the background depth image 242.

Referring back to FIG. 7, in step S52, the foreground region detection section 111 sets the variable i to 1.

In step S53, the foreground region detection section 111 detects a foreground region in the image of the imaging camera i. In particular, the foreground region detection section 111 calculates a region in which the foreground 3D model or the foreground space is projected to the coordinate system of the image of the imaging camera i using the camera parameters of the imaging camera i. Then, the foreground region detection section 111 determines the region obtained by the calculation as a foreground region in the image of the imaging camera i.

Figure 13:
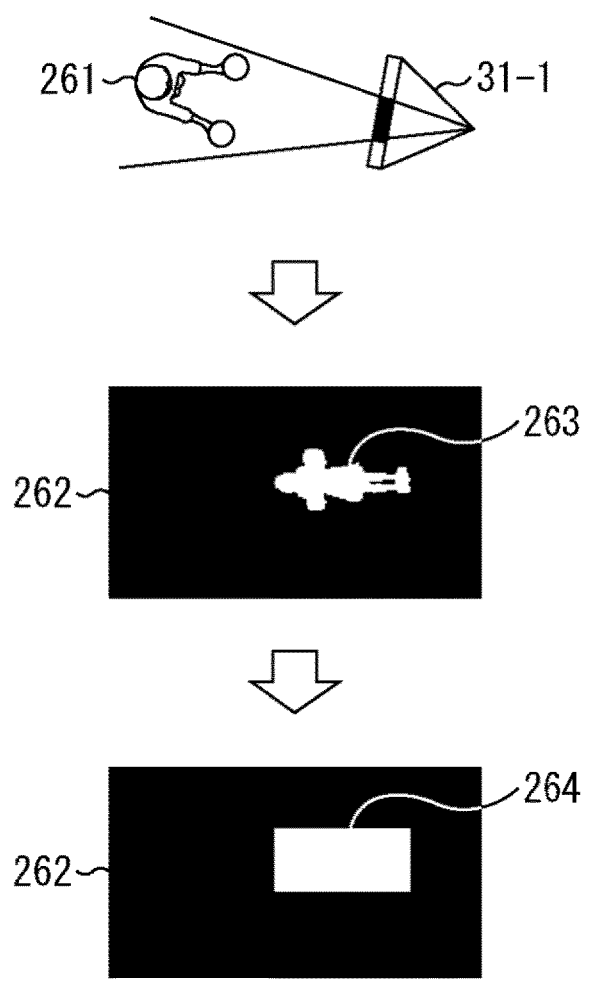
FIG. 13 is a view illustrating a detection method of a foreground region.

For example, by calculating a region in which a foreground space 261 is projected to the coordinate system of an image of the imaging camera 31-1 as depicted in the upper figure of FIG. 13, a foreground region 263 in an image 262 of the imaging camera i is detected as depicted in the middle figure.

In step S54, the segmentation image generation section 112 sets a segmentation region of the image of the imaging camera i. In particular, the segmentation image generation section 112 determines a rectangular bounding box for the foreground region detected in step S53. Then, the segmentation image generation section 112 sets the determined bounding box as a segmentation region.

For example, as depicted in the lower figure in FIG. 13, a bounding box 264 surrounding the foreground region 263 of the middle figure in FIG. 13 is set as a segmentation region.

In step S55, the segmentation image generation section 112 generates a segmentation image of the imaging camera i. In particular, the segmentation image generation section 112 segments an image in the segmentation region from the texture image of the imaging camera i to generate a segmentation texture image.

Accordingly, the segmentation texture image becomes an image in a region, which includes the object, narrowed by clopping the segmentation region from the texture image. Further, the segmentation image generation section 112 generates a segmentation depth image by segmenting an image in the segmentation region from the depth image of the imaging camera i. Accordingly, the segmentation depth image is an image in a region, which includes the object, narrowed by clopping the segmentation region from the depth image.

In step S56, the segmentation image generation section 112 generates segmentation information metadata of the imaging camera i. Here, an example of the segmentation information metadata is described with reference to FIG. 14.

Figure 14:
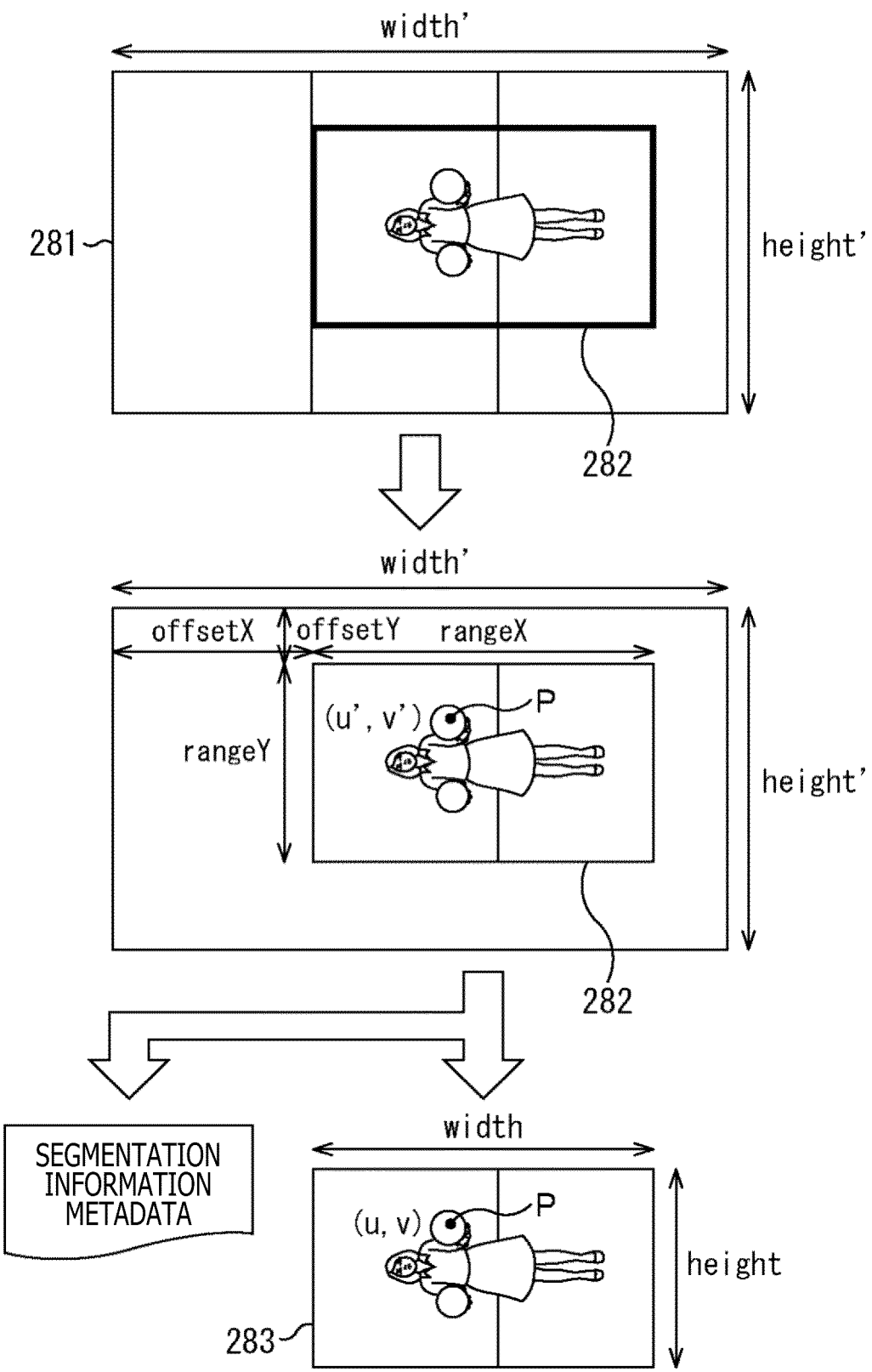
FIG. 14 is a view illustrating a calculation method of parameters of segmentation information metadata.

FIG. 14 depicts an example of a case in which a segmentation region 282 is set in a texture image 281 and a segmentation image 283 is segmented. For example, the segmentation image generation section 112 calculates parameters included in the segmentation information metadata by the following expressions (1) to (4).

$$\text{occupancy}X = \text{range}X/\text{width}' \tag{1}$$

$$\text{occupancy}Y = \text{range}Y/\text{height}' \tag{2}$$

$$\text{normOffset}X = \text{offset}X/\text{width}' \tag{3}$$

$$\text{normOffset}Y = \text{offset}Y/\text{height}' \tag{4}$$

Here, width' is the width of the texture image 281, and height' is the height of the texture image 281. rangeX is the width of the segmentation region 282, and rangeY is the height of the segmentation region 282. offsetX is the distance between the left upper corner of the texture image 281 and the left upper corner of the segmentation region 282 in the X direction (widthwise direction), and offsetY is the distance between the left upper corner of the texture image 281 and the left upper corner of the segmentation region 282 in the Y direction (heightwise direction).

Accordingly, occupancyX indicates the occupancy of the segmentation region 282 in the texture image 281 in the X direction, and the occupancyY indicates the occupancy of the segmentation region 282 in the texture image 281 in the Y direction. normOffsetX is a parameter obtained by normalizing offsetX, and normOffsetY is a parameter obtained by normalizing offsetY. By these parameters, the position of the segmentation region 282 in the texture image 281 is indicated.

It is to be noted that the relationship between the coordinates (u', v') of a point P in FIG. 14 on the coordinate system of the texture image 281 and the coordinates (u, v) on the coordinate system of the segmentation image 283 is represented by the following expressions (5) and (6).

$$u = (u' - \text{normOffset}X)/\text{occupancy}X \tag{5}$$

$$v = (v' - \text{normOffset}Y)/\text{occupancy}Y \tag{6}$$

Figures 15, 16:
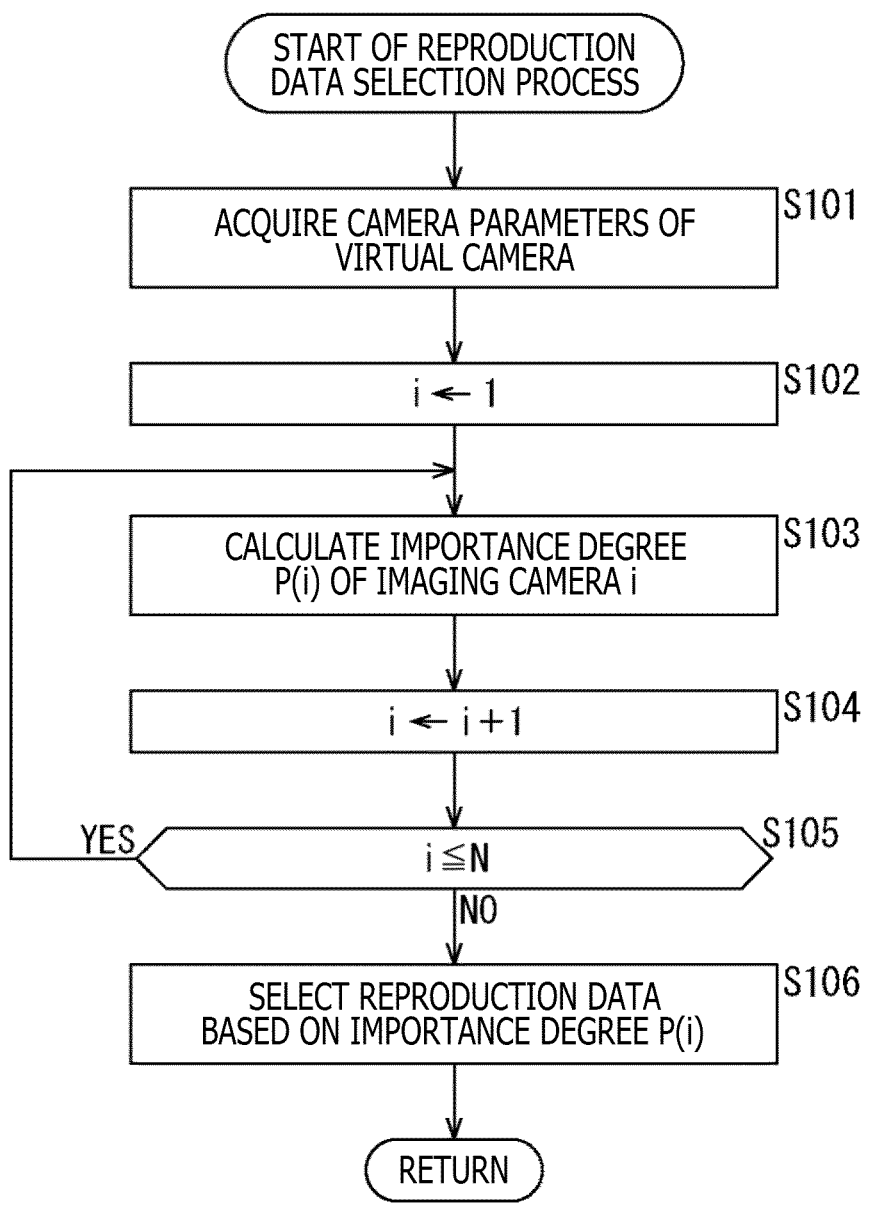
FIG. 15 is a view depicting a particular example of segmentation information metadata.
FIG. 16 is a flow chart illustrating details of a reproducing data selection process.

FIG. 15 depicts a particular example of the segmentation information metadata. In this example, normOffsetX, occupancyX, normOffsetY, and occupancyY are set to 0.05, 0.5, 0.01, and 0.5, respectively.

The segmentation image generation section 112 supplies the segmentation texture image, segmentation depth image, segmentation information metadata, and camera parameters of the imaging camera i to the selection section 103.

Referring back to FIG. 7, in step S57, the segmentation image generation section 112 increments the variable i by one.

In step S58, the segmentation image generation section 112 decides whether or not the variable i is equal to or smaller than N. It is to be noted that N is the number of the imaging cameras 31. In the case where it is decided that the variable i is equal to or smaller than N, the processing returns to step S53.

Thereafter, the processes in steps S53 to S58 are executed repetitively until after it is decided in step S58 that the variable i is greater than N. By this, segmentation images and segmentation information metadata of the imaging camera i to the imaging camera N are generated.

On the other hand, in the case where it is decided in step S58 that the variable i is greater than N, the segmentation process is ended.

Referring back to FIG. 6, in step S3, the selection section 103 executes a reproducing data selection process. Here, details of the reproducing data selection process are described with reference to a flow chart of FIG. 16.

In step S101, the importance degree setting section 121 acquires camera parameters of the virtual camera from the inputting device 13. The camera parameters of the virtual cameral include parameters of same kinds as those of the camera parameters of the imaging camera 31.

In step S102, the importance degree setting section 121 sets 1 to the variable i.

In step S103, the importance degree setting section 121 calculates an importance degree P(i) (i=1 to N) of the imaging camera i.

The importance degree P(i) is calculated, for example, on the basis of a relative relationship of at least one of a position or a direction between each imaging camera 31 (real point of view) and a virtual camera 302 (virtual point of view).

Here, examples of the calculation of the importance degree P(i) are described with reference to FIGS. 17 to 19.

Figure 17:
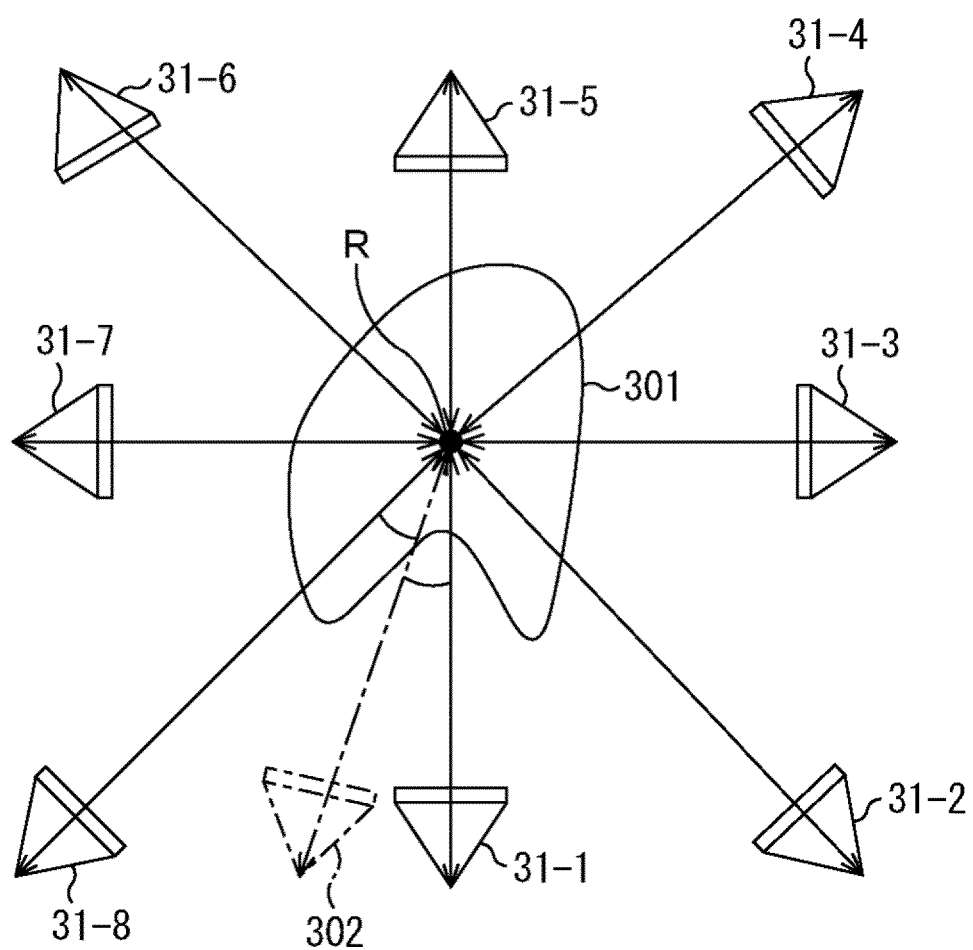
FIG. 17 is a view illustrating a first example of a setting method of an importance degree of an imaging camera.

FIG. 17 depicts an example in which the importance degree P(i) of each imaging camera 31 is calculated on the basis of a relationship between the direction of an object 301 that is a display target from each imaging camera 31 (real point of view) and the direction of the object 301 from the virtual camera 302 (virtual point of view). In this case, the importance degree P(i) is calculated by the following expression (7).

$$P(i)=Ci \cdot Cv \tag{7}$$

Here, Ci indicates a vector from the imaging camera 31-i to the object 301. Cv indicates a vector from the virtual camera 302 to the object 301. Ci·Cv indicates the inner product of the vector Ci and the vector Cv.

According, the importance degree P(i) changes in inverse proportion to the angle defined by the vector Ci and the vector Cv and increases as the angle defined by the vector Ci and the vector Cv decreases. In other words, the imaging camera 31 whose direction to the object 301 is nearer to that of the virtual camera 302 has a higher importance degree P(i).

It is to be noted that the vector Ci and the vector Cv are set with reference to a representative point R of the object 301. The representative point R can be set by an arbitrary method. For example, the point on the object 301 at which the total in distance from the imaging cameras 31 and the virtual camera 302 is in the minimum is set as the representative point R. As an alternative, for example, the middle position between a maximum value and a minimum value of the coordinates of the apex of the object 301 in the X direction, Y direction, and Z direction of a world coordinate system is set as the representative point R. As another alternative, for example, the most significant position in the object 301 is set as the representative point R. For example, in the case where the object 301 is a person, the center of the face of the person or the like is set as the representative point R.

Figure 18:
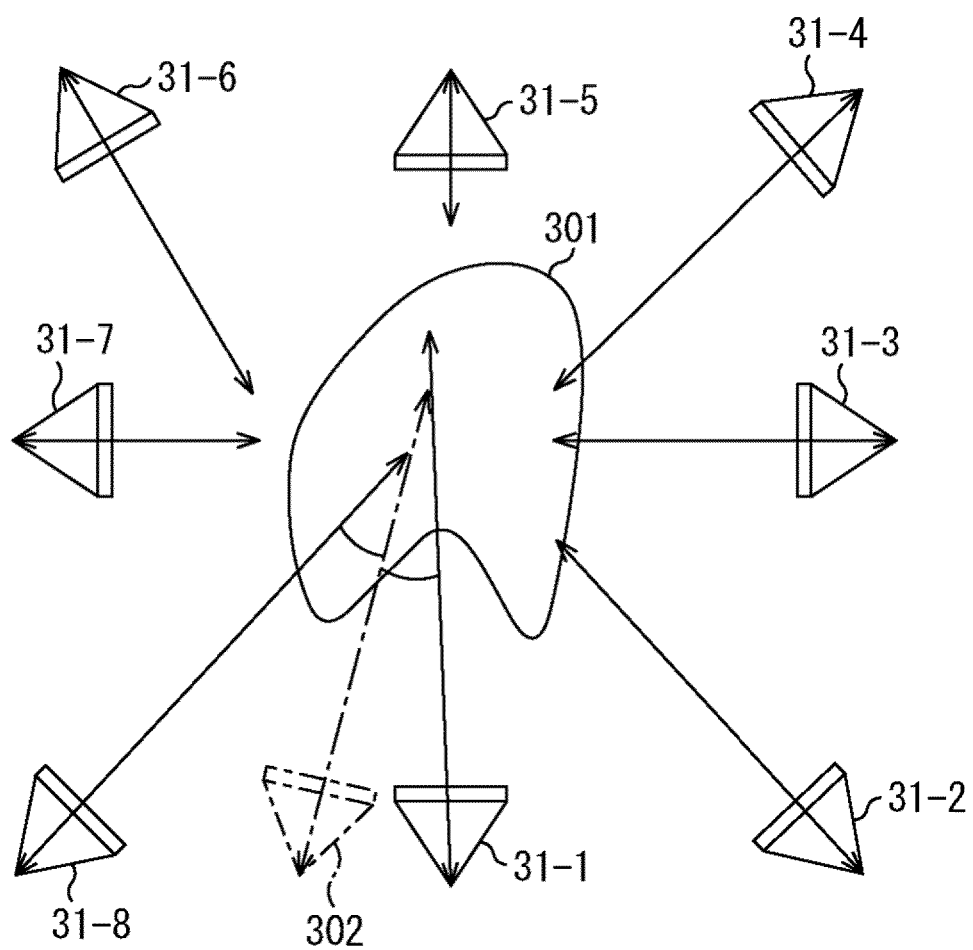
FIG. 18 is a view illustrating a second example of the setting method of an importance degree of an imaging camera.

FIG. 18 depicts an example in which the importance degree P(i) is calculated on the basis of the relationship between the optical axis of each imaging camera 31 (direction of the real point of view) and the optical axis of the virtual camera 302 (direction of the virtual point of view). In this case, the importance degree P(i) is calculated by the following expression (8).

$$P(i)=Zi \cdot Zv \tag{8}$$

Here, Zi indicates an optical axis vector of the imaging camera 31-i. Zv indicates an optical axis vector of the virtual camera 302. Zi·Zv indicates the inner product of the optical axis vector Zi and the optical axis vector Zv.

Accordingly, the importance degree P(i) changes in inverse proportion to the angle defined by the optical axis vector Zi and the optical axis vector Zv and increases as the angle defined by the optical axis vector Zi and the optical axis vector Zv decreases. In other words, the imaging camera 31 whose optical axis direction is nearer to the virtual camera 302 has a higher importance degree P(i).

Figure 19:
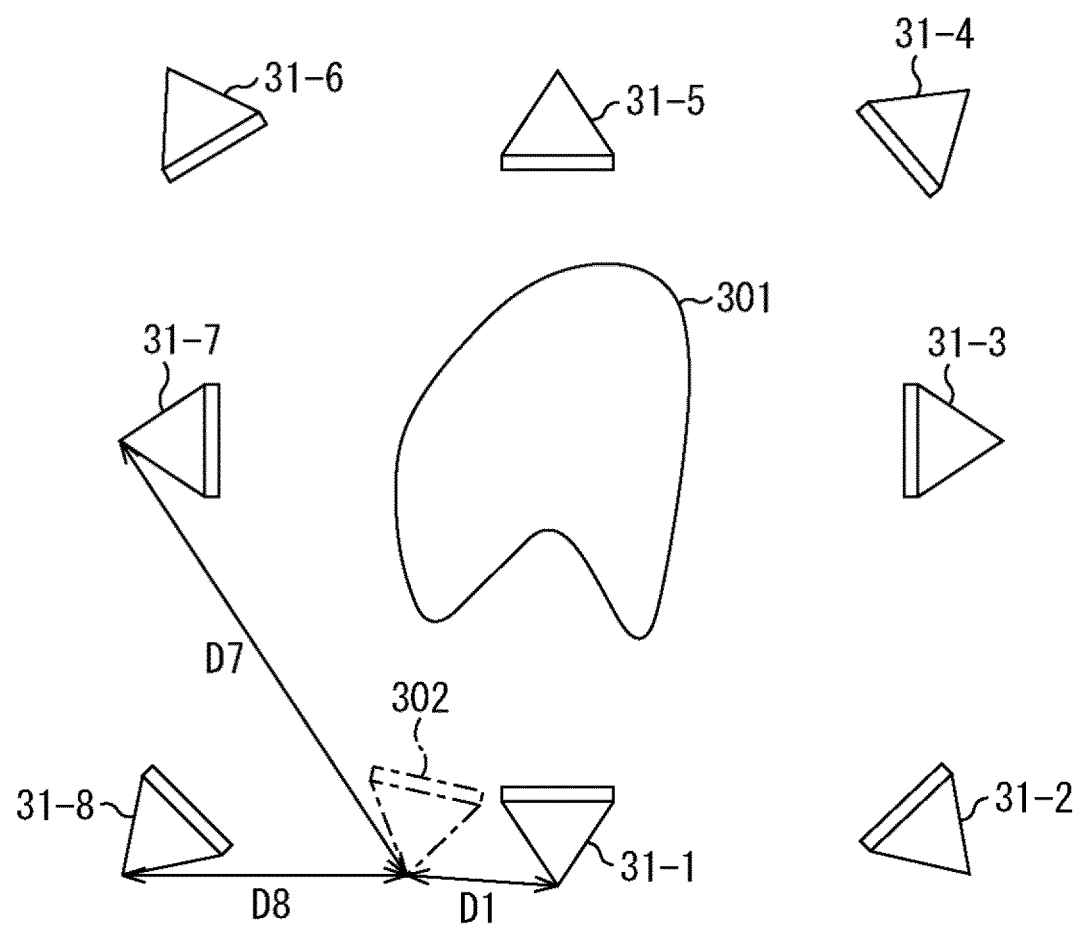
FIG. 19 is a view illustrating a third example of the setting method of an importance degree of an imaging camera.

FIG. 19 depicts an example in which the importance degree P(i) is calculated on the basis of the distance between each imaging camera 31 (real point of view) and the virtual camera 302 (virtual point of view). In this case, the importance degree P(i) is calculated by the following expression (9).

$$P(i)=1-D1/\Sigma Di \tag{9}$$

Here, Di indicates the distance between the imaging camera 31-i and the virtual camera 302.

Accordingly, the imaging camera 31 that is nearer to the virtual camera 302 has a higher importance degree P(i).

It is to be noted that the importance degree P(i) of FIG. 18 and the importance degree P(i) of FIG. 19 have no relationship to position and movement of the object 301. Accordingly, if the position and the direction of each imaging camera 31 and the virtual camera 302 are fixed, then the importance degree P(i) can be fixed.

It is to be noted that the importance degree setting section 121 may set the importance degree in combination of two or more of the three importance degrees P(i) described above.

Further, the importance degree setting section 121 may set the importance degree on the basis of the substance of images captured by the imaging cameras 31. For example, the importance degree of the imaging camera 31 nearer to the front of an object that is a display target may have a higher importance degree. As an alternative, in the case where the object that is a display target is a person, the importance degree of an imaging camera 31 that is used for capturing a texture image in which the face is imaged may have a higher importance degree.

Referring back to FIG. 16, in step S104, the importance degree setting section 121 increments the variable i by one.

In step S105, the importance degree setting section 121 decides whether or not the variable i is equal to or lower than N. It is to be noted that N is the number of imaging cameras 31. In the case where it is decided that the variable i is equal to or lower than N, the processing returns to step S103.

Thereafter, the processes in steps S103 to S105 are executed repetitively until after it is decided in step S105 that the variable i is equal to or greater than N. The importance degree P(i) of all imaging cameras 31-i is calculated thereby.

On the other hand, in the case where it is decided in step S105 that the variable i is greater than N, the processing advances to step S106.

In step S106, the reproducing data selection section 122 selects reproducing data on the basis of the importance degrees P(i). For example, the reproducing data selection section 122 selects a predetermined number of imaging cameras 31 in the descending order of the importance degree P(i). As an alternative, for example, the reproducing data selection section 122 selects imaging cameras 31 whose importance degree P(i) is equal to or higher than a predetermined threshold value. Then, the reproducing data selection section 122 selects segmentation texture images and segmentation depth images of the selected imaging cameras 31 as reproducing texture images and reproducing depth images, respectively.

Further, the reproducing data selection section 122 sets the importance degree P(i) of each imaging camera 31 used for imaging as the importance degree of the reproducing image. The reproducing data selection section 122 supplies the reproducing images (reproducing texture images and reproducing depth images), the importance degrees of the reproducing images, and segmentation information metadata and camera parameters corresponding to the reproducing images to the packing section 104.

Thereafter, the reproducing data selection process is ended.

Referring back to FIG. 6, in step S4, the packing section 104 executes a packing process. Here, details of the packing process are described with reference to a flow chart of FIG. 20.

In step S151, the packing image generation section 131 sets a packing layout. Here, in the packing layout, a layout of packing regions for mapping reproducing texture images or reproducing depth images is indicated in a rectangular region same as that of the packing image.

For example, the packing layout is set on the basis of the number of reproducing images to be selected (hereinafter referred to as selection number) or the importance degree of each reproducing image.

For example, in the case where the selection number of reproducing images is variable, a packing layout is set on the basis of the selection number. For example, a packing layout in which a rectangular region of a size same as that of the packing image is divided into the number of packing regions equal to the selection number. At this time, the packing regions may be same as each other or may be different from each other in shape and size. In the latter case, a packing region to which a reproducing image having a higher importance degree is mapped has a greater size.

Figure 21:
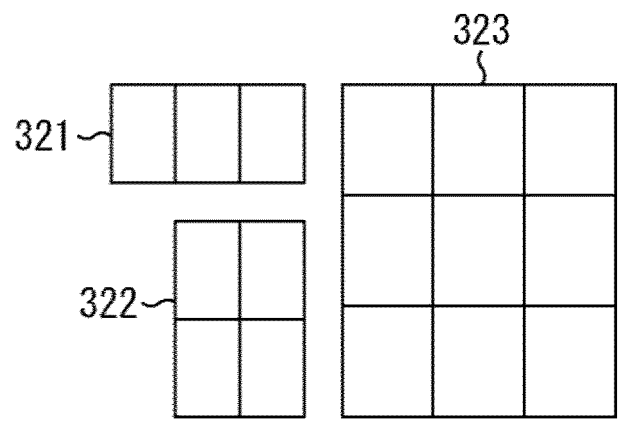
FIG. 21 is a view depicting an example of a packing layout.

FIG. 21 depicts examples of a packing layout in which packing regions of a same shape and size are arrayed in a lattice-like array. In a packing layout 321, rectangular packing regions of a same shape and size are arrayed in a matrix of one row×three columns. In another packing layout 322, packing regions of a same shape and size are arrayed in a matrix of two rows×two columns. In a further packing layout 323, packing regions of a same shape and size are arrayed in a matrix of three rows×three columns.

On the other hand, in the case where the selection number of reproducing images is fixed, the packing layout may be fixed or may be changed as occasion demands. In the case where the packing regions are different in shape or size from each other, for example, a packing region to which a reproducing image having a higher importance degree is mapped has a greater size. On the other hand, in the case where the packing layout is variable, for example, the size of each packing region is set in accordance with the importance degree of each reproducing image. For example, a packing region to which a reproducing image having a higher importance degree is mapped has a greater size.

In step S152, the packing image generation section 131 sets 1 to the variable i.

In step S153, the packing image generation section 131 decides whether or not the packing layout is a lattice-like packing layout. In the case where the packing regions of a same shape and size are not arrayed in a lattice-like pattern in the set packing layout, the packing image generation section 131 decides that the packing layout is not a lattice-like packing layout and advances the processing to step S154.

In step S154, the metadata generation section 132 generates metadata of the packing region i. In particular, in the case of a packing layout that does not have a lattice-like pattern, the packing information metadata includes a plurality of packing region metadata corresponding to the individual packing regions. Then, the metadata generation section 132 generates packing region metadata corresponding to the packing region i.

Figure 22:
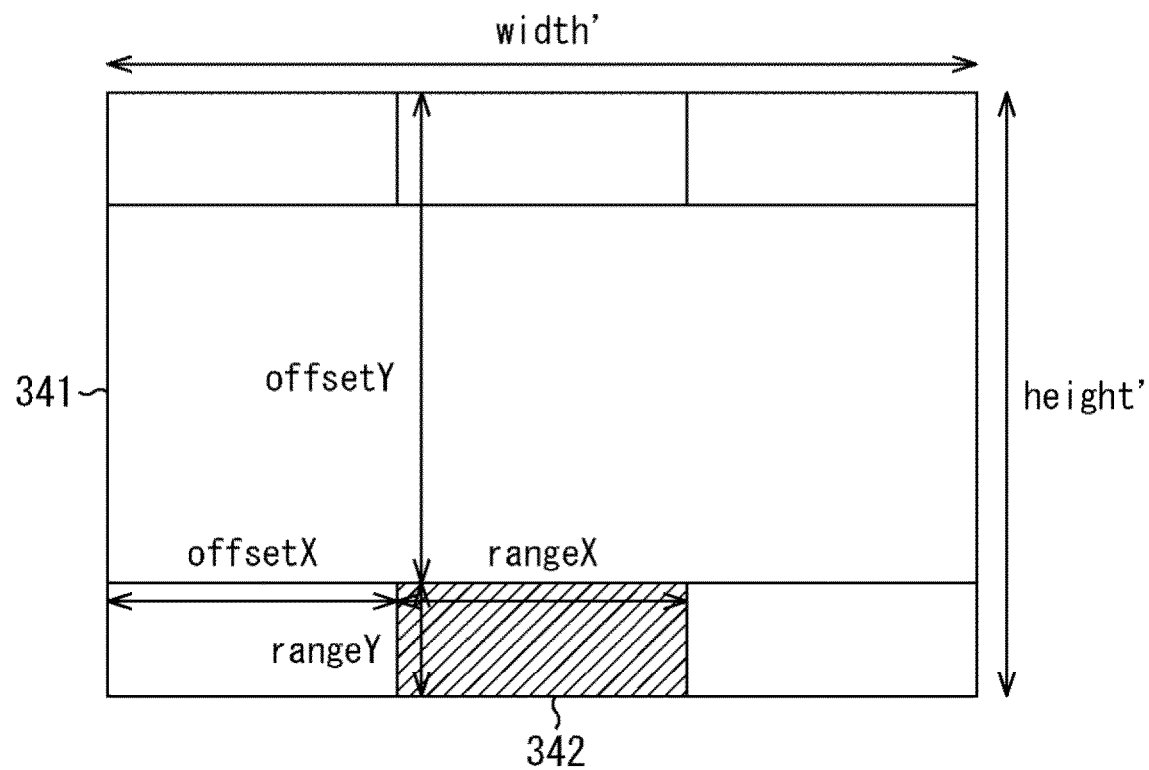
FIG. 22 is a view illustrating a calculation method of parameters of packing information metadata.

FIG. 22 depicts an example of a packing layout 341 that is not a lattice-like packing layout. In the packing layout 341, packing regions of a same shape and size are disposed in a matrix of one row×three columns above and below a central large packing region.

For example, parameters of the packing region metadata of a packing region 342 indicated by slanting lines in the packing layout 341 are calculated by the following expressions (10) to (13).

$$\text{occupancyX} = \text{rangeX}/\text{width}' \quad (10)$$

$$\text{occupancyY} = \text{rangeY}/\text{height}' \quad (11)$$

$$\text{normOffsetX} = \text{offsetx}/\text{width}' \quad (12)$$

$$\text{normOffsetY} = \text{offsety}/\text{height}' \quad (13)$$

Here, width' is the width of the packing layout 341 (packing image), and height' is the height of the packing layout 341. rangeX is the width of the packing region 342, and rangeY is the height of the packing region 342. offsetX is the distance between the left upper corner of the packing layout 341 and the left upper corner of the packing region 342 in the X direction (widthwise direction), and offsetY is the distance between the left upper corner of the packing layout 341 and the left upper corner of the packing region 342 in the Y direction (heightwise direction).

Accordingly, occupancyX indicates the occupancy of the packing region 342 in the packing layout 341 (packing image) in the X direction, and occupancyY indicates the occupancy of the packing region 342 in the packing layout 341 in the Y direction. normOffsetX is a normalized parameter of offsetX, and normOffsetY is a normalized parameter of offsetY.

In step S155, the packing section 104 selects a reproducing image to be mapped to the packing region i. In particular, the packing image generation section 131 selects an image to be mapped to the packing region i from between the reproducing texture image and the reproducing depth image. At this time, the packing image generation section 131 selects a reproducing image such that a reproducing image having a higher importance degree is set to a greater packing region. Alternatively, for example, the packing image generation section 131 selects a reproducing image of a shape proximate to the shape of the packing region i.

Further, the metadata generation section 132 adds the ID of the imaging camera 31 corresponding to the selected image to the packing region metadata.

FIG. 23 depicts a particular example of packing region metadata. In this example, normOffsetX, occupancyX, normOffsetY, and occupancyY are set to 0.33, 0.33, 0.8, and 0.2, respectively. Further, camera_id is set to 1. camera_id is a parameter indicative of the ID of the imaging camera 31 corresponding to a reproducing image to be mapped to the packing region.

Thereafter, the processing advances to step S157.

On the other hand, in the case where it is decided in step S153 that the packing layout is a lattice-like packing layout, the processing advances to step S156.

In step S156, the packing image generation section 131 sects a reproducing image to be mapped to the packing region i similarly to the process in step S155. Further, the metadata generation section 132 adds the ID of the imaging camera 31 corresponding to the selected reproducing image to the packing information metadata.

Figure 24:
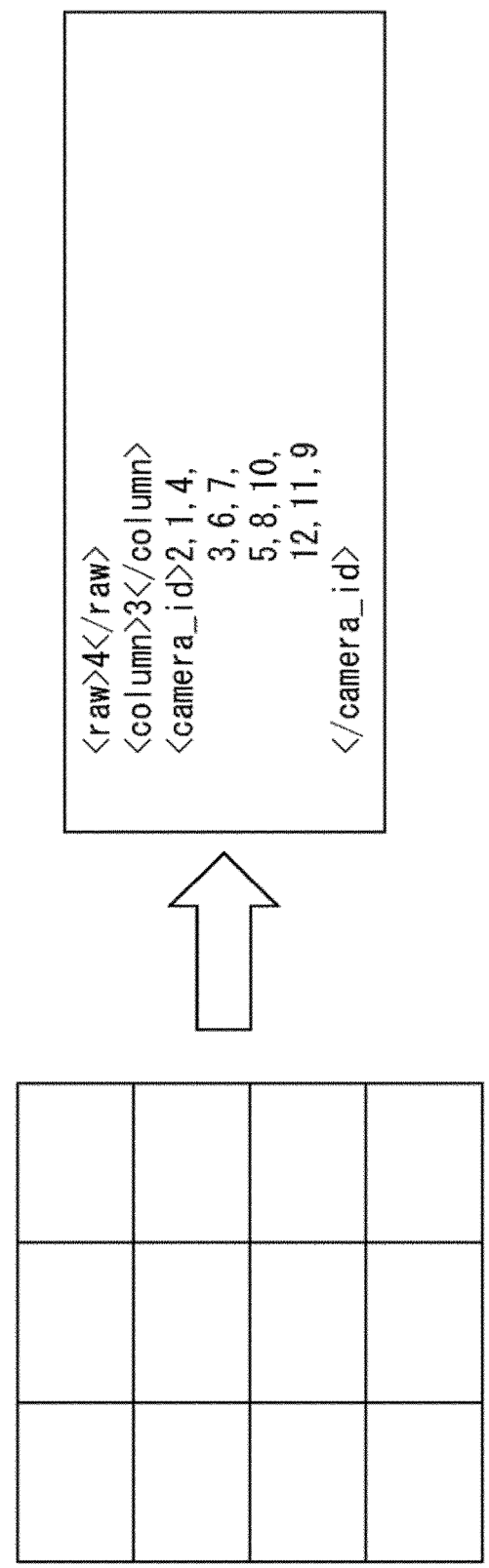
FIG. 24 is a view depicting another particular example of the packing information metadata.

FIG. 24 depicts an example of packing metadata corresponding to a lattice-like packing layout.

On the left side in FIG. 24, an example of the packing layout is depicted. In this packing layout, packing regions of a same shape and size are arrayed in a lattice-like pattern in a matrix of four rows×three columns.

On the right side in FIG. 24, an example of packing information metadata generated in regard to the packing layout on the left side is depicted. In this example, 4 is set to a parameter raw representative of a row number of the packing layout, and 3 is set to a parameter column representative of a column number. Further, a parameter camera_id indicative of the ID of an imaging camera 31 corresponding to a reproducing image to be mapped to each packing region is set. For example, camera_id of the packing region in the first row of the first column is set to 2; camera_id of the packing region in the first row of the second column is set to 1; and camera_id of the packing region in the second row of the first column is set to 3.

For example, the metadata generation section 132 sets values of the parameters raw and column in the process in first step S156 in the loop. Further, in the process in step S156 in each loop, the metadata generation section 132 sets, to the parameter camera_id corresponding to the packing region to which the reproducing image is to be mapped, the ID of an imaging camera 31 corresponding to the reproducing image.

Thereafter, the processing advances to step S157.

In step S157, the metadata generation section 132 decides whether or not the variable i is equal to or smaller than M. It is to be noted that M represents the number of packing regions in the packing layout. In the case where it is decided that the variable i is equal to or smaller than M, the processing returns to step S153.

Thereafter, the processing returns to step S153, and the processes in steps S153 to S157 are repetitively executed until after it is decided in step S157 that the variable i is greater than M. Consequently, reproducing images to be mapped to the packing regions in the packing layout are selected and packing information metadata are generated.

On the other hand, in the case where it is decided in step S157 that the variable i is greater than M, the processing advances to step S158.

In step S158, the packing image generation section 131 generates a packing image. In particular, the packing image generation section 131 maps the reproducing texture images to the respective packing regions of the packing layout. Consequently, a packing texture image in which a plurality of the reproducing texture images are united into one is generated.

Figure 25:
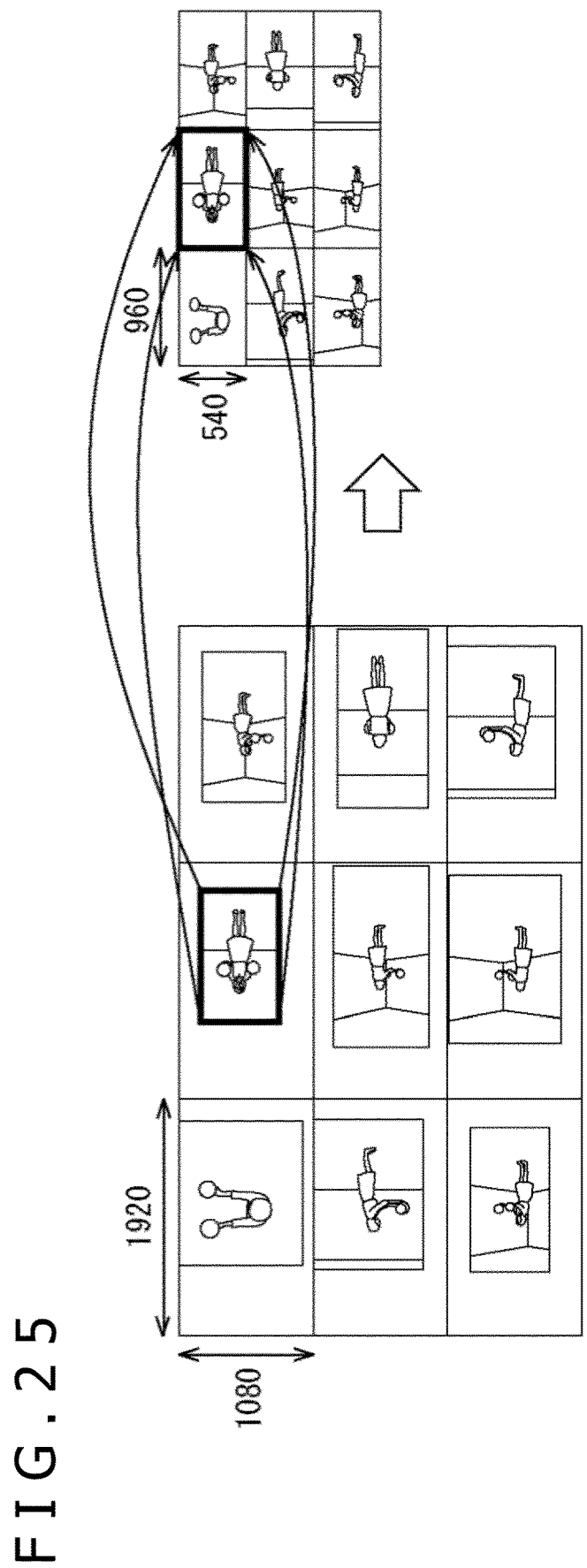
FIG. 25 is a view depicting an example of mapping of a reproducing image.

For example, as depicted in FIG. 25, reproducing texture images segmented from nine texture images of 1080 pixels vertically×1920 pixels horizontally are mapped to a packing layout in which packing regions of 540 pixels vertically×960 pixels horizontally are arraigned in a matrix of 3 rows×3 columns. Consequently, the nine reproducing texture images are united into a single packing texture image.

Figure 26:
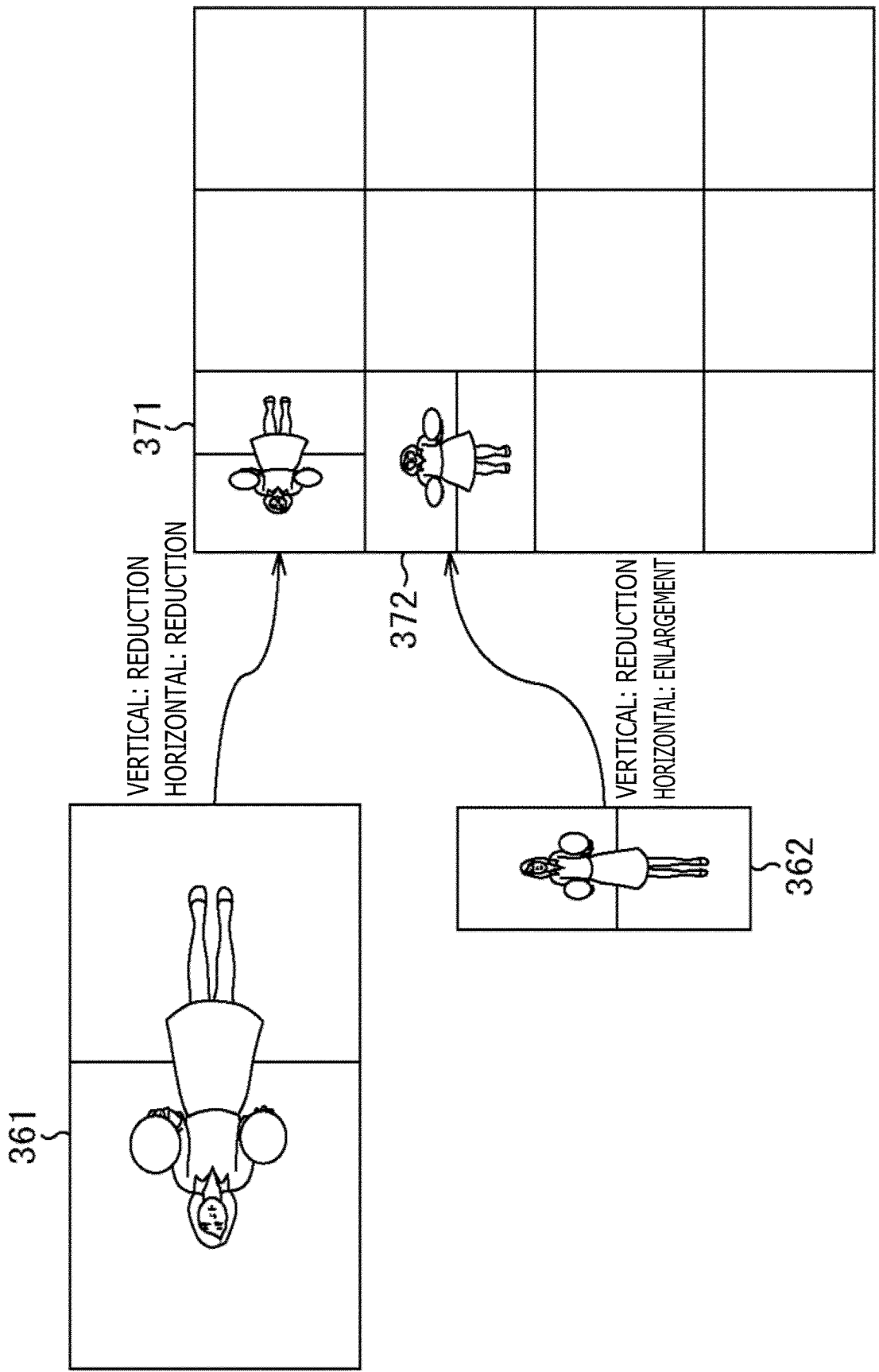
FIG. 26 is a view illustrating a scaling process upon mapping of a reproducing image.

At this time, the packing image generation section 131 performs scaling of the reproducing texture images in order to adjust the size of each reproducing texture image to the size of a packing region to which it is to be mapped. For example, in the case where a reproducing texture image 361 is to be mapped to a packing region 371 as depicted in FIG. 26, the reproducing texture image 361 is reduced in the vertical direction and the horizontal direction. Further, in the case where a reproducing texture image 362 is to be mapped to a packing region 372, the reproducing texture image 362 is reduced in the vertical direction and extended in the horizontal direction.

Similarly, the packing image generation section 131 maps each reproducing depth image to a packing region of the packing layout. Consequently, a packing depth image in which the reproducing depth images are united into one is generated.

The packing image generation section 131 supplies the packing images (packing texture image and packing depth image) and the segmentation information metadata, packing information metadata, and camera parameters corresponding to the packing images to the encoding section 105.

Thereafter, the packing process is ended.

Referring back to FIG. 6, in step S5, the encoding section 105 encodes the packing images. In particular, the encoding section 105 encodes the packing texture image and the packing depth image by a predetermined encoding method. As the encoding method, for example, the AVC (Advanced Video Coding) method, the HEVC (High Efficiency Video Coding) method or the like can be adopted. The encoding section 105 stores the encoded packing texture image and the encoded packing depth image after the encoding as well as the segmentation information metadata, packing information metadata, and camera parameters corresponding to the images as part of an encoded stream into the storage section 106.

In step S6, the encoding section 105 decides whether or not encoding of all frames is ended. In the case where it is decided that encoding of all frames is not yet ended, the processing returns to step S1.

Thereafter, the processes in steps S1 to S6 are repetitively executed until after it is decided in step S6 that encoding of all frames is ended.

Consequently, a packing texture image and a packing depth image are generated for all frames, and the generated packing texture images and packing depth images are encoded and added to the encoded stream.

On the other hand, in the case where it is decided in step S6 that encoding of all frames is ended, the processing advances to step S7.

In step S7, the transmission section 107 transmits the encoded stream. In particular, the transmission section 107 transmits the encoded stream stored in the storage section 22 to the decoding device 41.

It is to be noted that each frame of the encoded stream includes an encoded packing texture image, an encoded packing depth image, and packing information metadata as well as segmentation information metadata and camera parameters corresponding to the reproducing texture image and the reproducing depth image packed in the encoded packing texture image and the encoded packing depth image.

It is to be noted that, for example, in the case where a packing layout and mapping of a reproducing image are fixed, the packing information metadata may not necessarily be included in each frame. Further, in the case where a segmentation region for each texture image and depth image is fixed, the segmentation information metadata may not necessarily be included in each frame of the encoded stream. Furthermore, in the case where the position and the direction of each imaging camera 31 are fixed, the camera parameters may not necessarily be included in each frame of the encoded stream.

Also it is possible to transit the segmentation information metadata, packing information metadata, and camera parameters separately from the encoded stream.

Thereafter, the encoding process is ended.

(Decoding Process)

Figure 27:
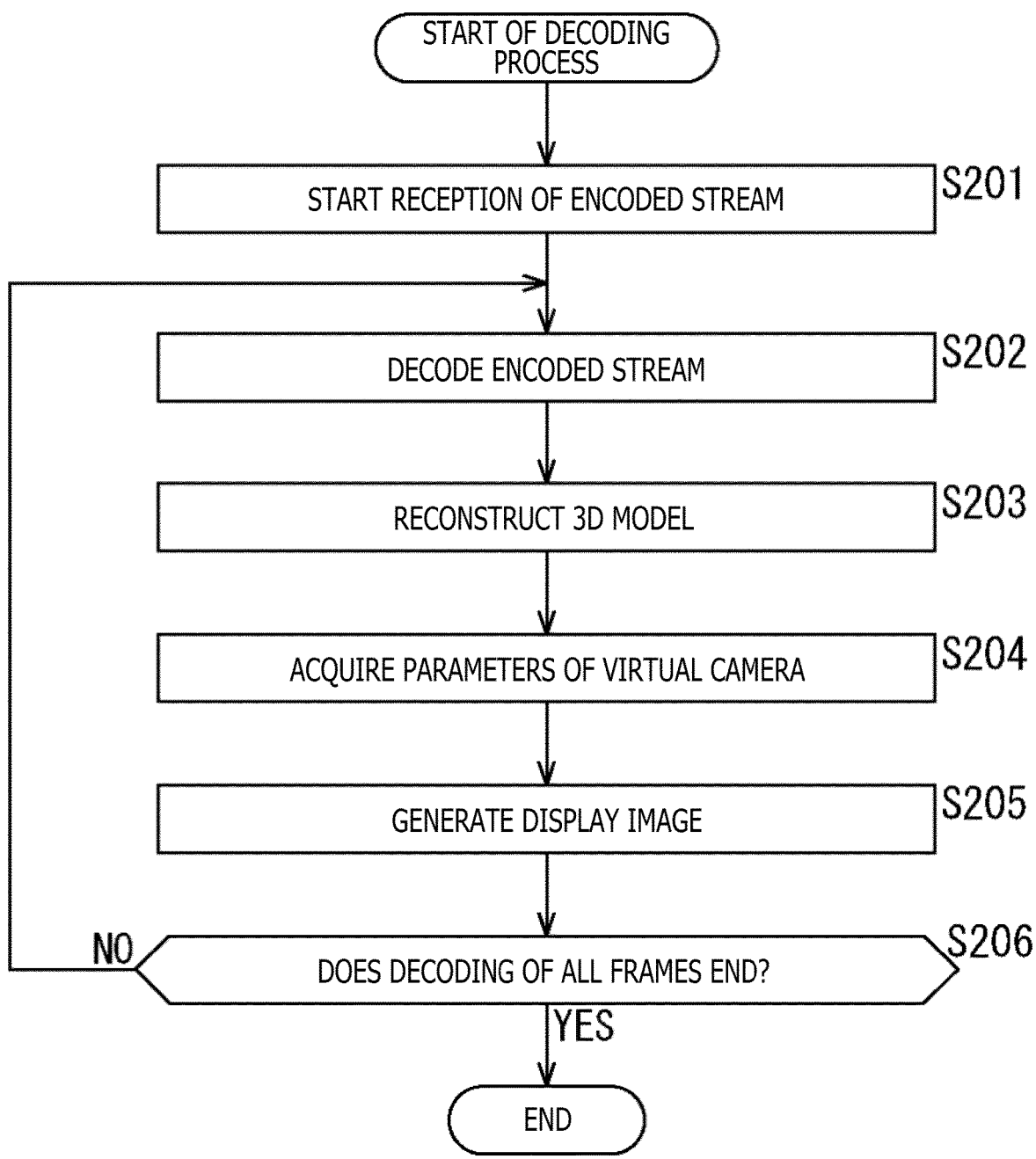
FIG. 27 is a flow chart illustrating an encoding process.

Now, a decoding process for decoding an encoded stream generated by the encoding device 23 using the decoding device 41 is described with reference to a flow chart of FIG. 27.

In step S201, the reception section 151 of the decoding device 41 starts reception of an encoded stream transmitted from the transmission section 107 of the encoding device 23. The reception section 151 sequentially stores the received encoded stream into the storage section 152.

In step S202, the decoding section 153 decodes the encoded stream. In particular, the decoding section 153 reads out data of a frame that becomes a decoding target from the encoded stream stored in the storage section 152. The decoding section 153 decodes an encoded packing texture image and an encoded packing depth image included in the read out data by a method corresponding to the encoding method by the encoding section 105 of the encoding device 23.

Further, the decoding section 153 separates the reproducing texture image packed in the decoded packing texture image on the basis of the packing information metadata. At this time, the decoding section 153 returns the size of the separated reproducing texture data to a size before packing on the basis of the segmentation information metadata corresponding to each reproducing texture image as occasion demands. Similarly, the decoding section 153 separates the reproducing depth image packed in the decoded packing depth image. Further, as occasion demands, the decoding section 153 returns the size of each reproducing depth image to its size before packing.

The decoding section 153 supplies the obtained reproducing texture image and reproducing depth image as well as the segmentation information metadata and the camera parameters corresponding to the images to the reconstruction section 154.

In step S203, the reconstruction section 154 re-constructs the 3D mode. In particular, the reconstruction section 154 generates a 3D model on the basis of the reproducing texture image and the reproducing depth image as well as the segmentation information metadata and the camera parameters corresponding to the images by a method similar to that by the reconstruction section 101 of the encoding device 23. It is to be noted that this 3D model is a model including almost the foreground of the imaging object upon imaging with the background almost removed. The reconstruction section 154 supplies the generated 3D model to the drawing section 155.

In step S204, the drawing section 155 acquires the camera parameters of the virtual camera from the inputting device 13. It is to be noted that, from the inputting device 13, camera parameters of the virtual camera having same values for a same frame of the encoded stream are supplied to the selection section 103 of the encoding device 23 and the drawing section 155 of the decoding device 41.

In step S205, the drawing section 155 generates a display image. In particular, the drawing section 155 generates, as a display image, a virtual texture image obtained when the foreground segmented by the encoding device 23 from the position of the virtual camera on the basis of the 3D model generated by the reconstruction section 154 and the camera parameters of the virtual camera. The drawing section 155 supplies the display image to the display device 42.

Figure 28:
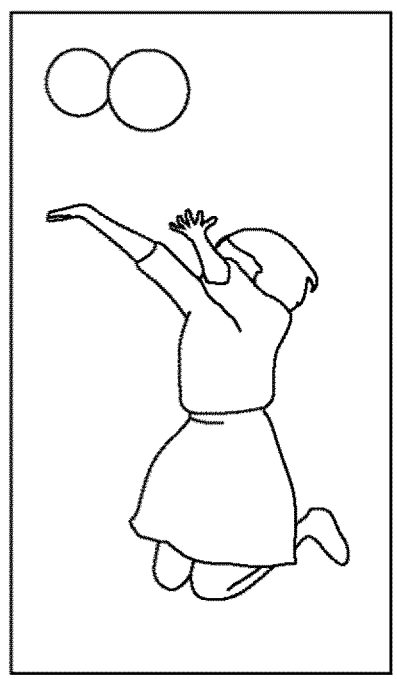
FIG. 28 is a view depicting an example of a display image.

Consequently, for example, a texture image depicted in FIG. 28, namely, a two-dimensional image including an object segmented as a display target, is displayed on the display device 42.

In step S206, the decoding section 153 decides whether or not decoding of all frames is ended. In the case where it is decided that decoding of all frames is not ended, the processing returns to step S202.

Thereafter, the processes in steps S202 to S206 are performed repetitively until after it is decided in step S206 that decoding of all frames is ended. Consequently, the frames of the encoded stream are decoded and a display image based on the point of view from the virtual camera is generated and supplied to the display device 42.

On the other hand, in the case where it is decided in step S206 that decoding of all frames is ended, the decoding process is ended.

It is possible for the reproduction section 12 to display an image where an object imaged by the data supplying section 11 is viewed from an arbitrary virtual point of view in such a manner as described above.

Figure 7:
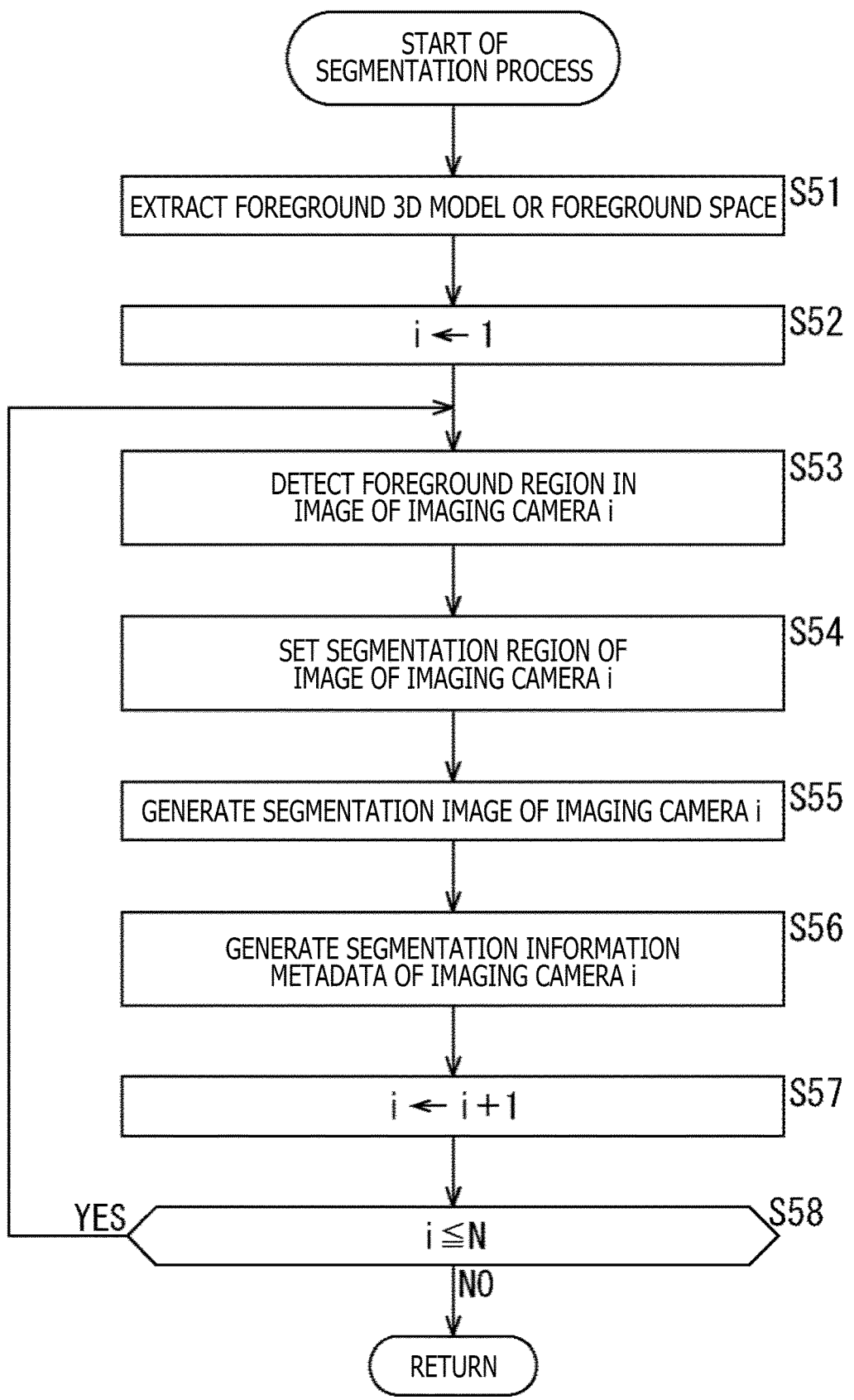
FIG. 7 is a flow chart illustrating details of a segmentation process.

Further, by performing the segmentation process of FIG. 7 or the reproducing data selection process of FIG. 16, the transmission amount of data to be transmitted from the data supplying section 11 to the reproduction section 12. Consequently, for example, it is suppressed that a video reproduced by the reproduction section 12 is deteriorated by the processing capacity of the reproduction section 12, the bandwidth limitation of the transmission line between the data supplying section 11 and the reproduction section 12 or the like. As an alternative, the bit rate of transmission data in the transmission line between the data supplying section 11 and the reproduction section 12 can be reduced.

Furthermore, by performing the segmentation process or the reproducing data selection process, it is possible to reduce the size of an image that becomes a target of encoding and decoding or to reduce the number of images. Accordingly, the load of the encoding process of the encoding section 105 or the decoding process of the decoding section 153 can be reduced.

Figure 20:
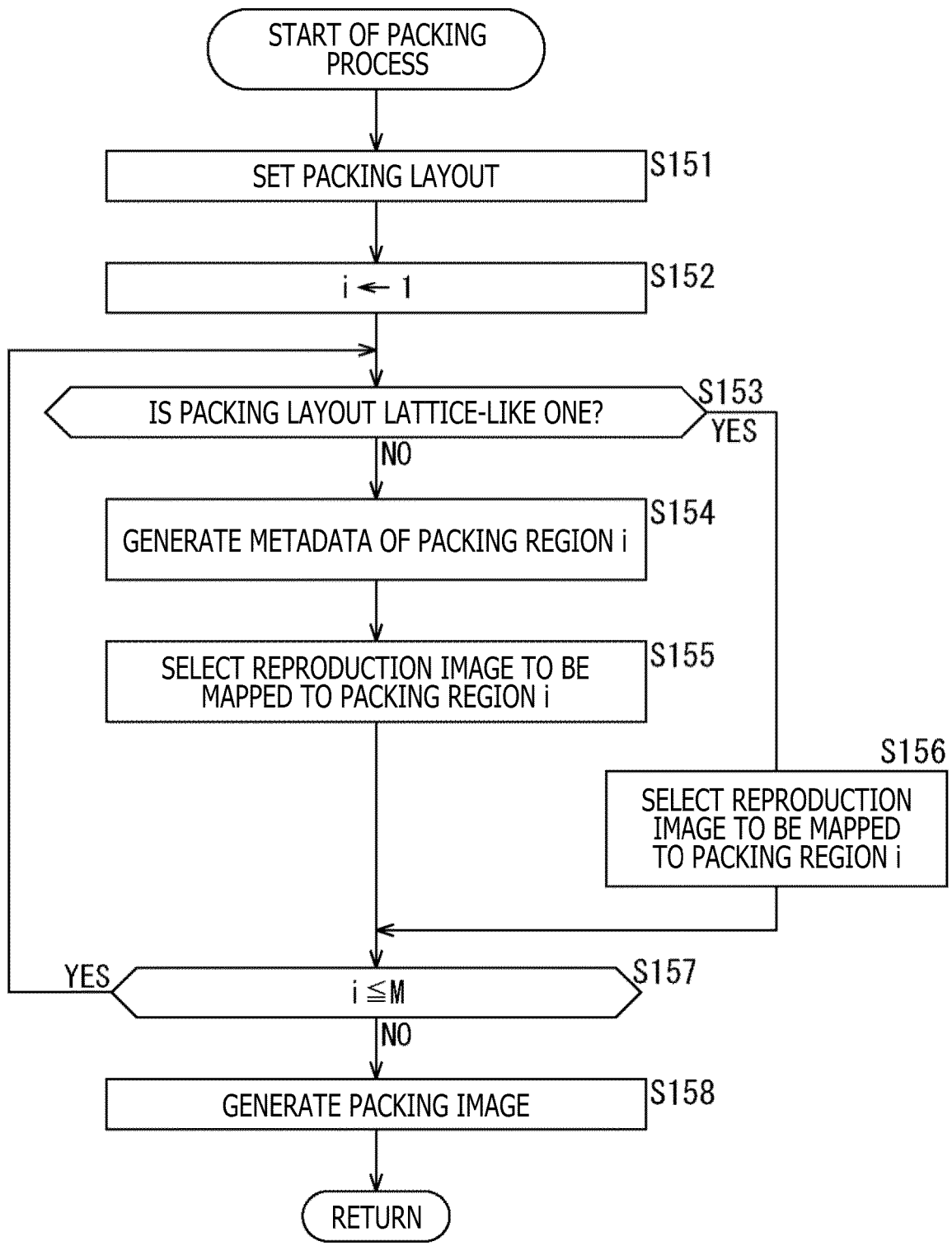
FIG. 20 is a flow chart illustrating details of a packing process.

Further, by performing the packing process of FIG. 20 after the segmentation process is performed, the reduction ratio of each reproducing image upon packing decreases (the ratio between images before and after reduction approaches 1). As a result, deterioration of the picture quality by reduction of the reproducing images can be suppressed.

Furthermore, since a reproducing texture image and a reproducing depth image to be supplied to the reproduction section 12 are selected on the basis of the importance degree based at least on one of the position and the direction of the virtual camera, deterioration of the picture quality by reduction of the texture images and depth images to be transmitted is suppressed.

Further, by performing the packing process, the number of images to be decoded by the decoding section 153 can be reduced, and the load on the decoding section 153 is reduced.

Furthermore, by performing the packing process, even if the segmentation process is performed, the size of an image to be transmitted from the data supplying section 11 to the reproduction section 12 can be fixed.

2. Modifications

In the following, modifications of the embodiment of the present technology described above are described.

Figure 6:
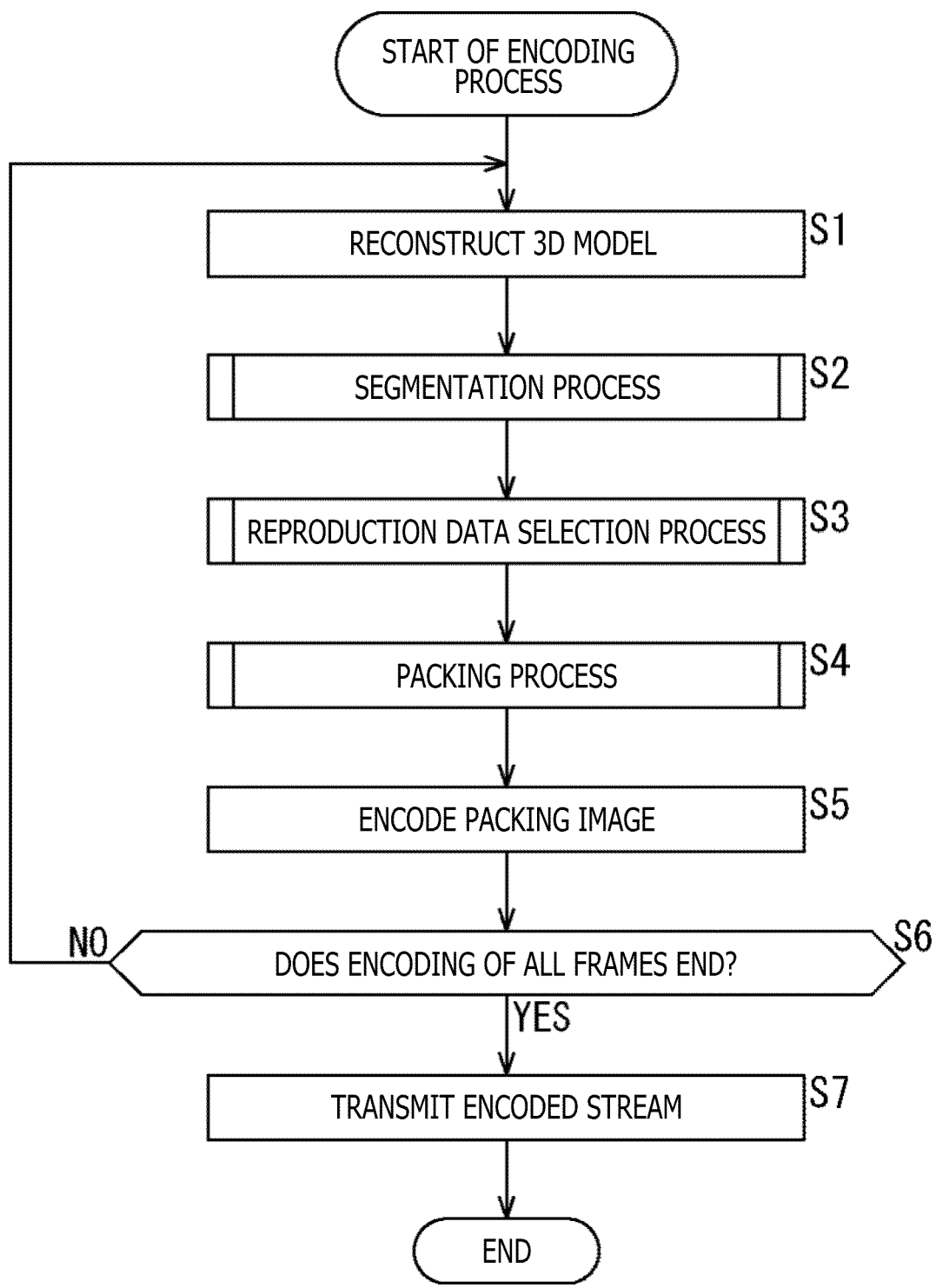
FIG. 6 is a flow chart illustrating an encoding process.

For example, the segmentation process in step S2 of FIG. 6 and the reproducing data selection process in step S3 can be interchanged. In particular, after the selection of a texture image and a depth image for reproduction is performed, the segmentation process may be performed for the selected image.

Also it is possible, for example, to omit one of the segmentation process and the reproducing data selection process. For example, in the case where the reproducing data selection process is omitted, all segmented images are packed into a packing image and transmitted from the data supplying section 11 to the reproduction section 12. Also it is possible, for example, to omit the packing process. Even if a process is omitted in this manner, the advantageous effect of reduction of the transmission amount of data by the transmission line between the data supplying section 11 and the reproduction section 12 can be achieved.

Also it is possible to execute the imaging process by the imaging section 21 and the encoding process by the encoding device 23 in parallel. In other words, also it is possible to perform generation of an encoded stream while imaging is performed.

Furthermore, in the encoding device 23, it is possible for the transmission section 107 to sequentially transmit an encoded stream in parallel when the encoding section 105 generates the encoded stream. In other words, also it is possible to sequentially transmit, while an encoded stream is generated, the generated encoded stream.

Further, the encoding device 23 and the decoding device 41 may be disposed in the same apparatus or may be disposed in different apparatus. In the latter case, the encoding device 23 and the decoding device 41 may be connected directly to each other or may be connected through a network or the like.

Furthermore, while the foregoing description indicates an example in which the inputting device 13 supplies camera parameters of the virtual camera to both the encoding device 23 and the decoding device 41, the camera parameters may otherwise be supplied to only any one of them. In this case, for example, the camera parameters of the virtual camera are supplied from one to the other of the encoding device 23 and the decoding device 41. Further, in the case where the camera parameters of the virtual camera are supplied from the encoding device 23 to the decoding device 41, the camera parameters of the virtual camera may be included in the encoded stream.

Also it is possible to provide, for example, the inputting device 13 in the data supplying section 11 (or the encoding device 23) or the reproduction section 12 (or the decoding device 41).

Furthermore, the present technology can be applied not only to a case in which both a texture image and a depth image are transmitted from the data supplying section 11 to the reproduction section 12 but also to a case in which any one of them is transmitted.

Further, while the foregoing description indicates an example in which the segmentation region is variable for each frame, the segmentation region may otherwise be fixed for each imaging camera 31 (real point of view). For example, a foreground region of a texture image of all frames that become a transmission target may be detected for each imaging camera 31 such that a bounding box including a region of a result of logical ORing of the detected foreground regions is set to a common segmentation region. It is to be noted that, for example, not all frames, but part of frames may be used to commonize a segmentation region, or a common segmentation region may be changed for each predetermined plural number of frames.

Furthermore, while the foregoing description described above is directed to an example in which one segmentation image is generated from each of a texture image and a depth image, two or more segmentation images may be generated. For example, in the case where a plurality of objects that becomes a display target exist, a segmentation image may be generated for each object from each of a texture image and a depth image.

Further, while the foregoing description is directed to an example in which the imaging cameras 31 image such that they surround an object from individually different points of view, for example, a single imaging camera 31 may include a plurality image sensors such that they image an object from a plurality of different points of view. As an alternative, for example, the imaging camera 31 may move such that it images an object from a plurality of different points of view.

Furthermore, it is sufficient if the real points of view for imaging an object are disposed so as to surround at least that portion of an object that becomes a display target. For example, in the case where only the front of an object becomes a display target, the real points of view may be disposed so as to surround only a portion of the object in the proximity of the front.

Further, the present technology be applied not only to a case in which images captured from a plurality of real points of view are used as point-of-view images but also to a case in which, for example, images generated from a plurality of points of view (for example, computer graphic (CG) images) are used as point-of-view images. For example, the present technology can be applied also to a case in which a plurality of CG images from a plurality of points of view designated in a CG space is generated and a virtual image from a virtual point of view is generated on the basis of the plurality of generated CG images.

Further, the display device 42 may be configured from a three-dimensional head-mounted display, a three-dimensional monitor or the like. In this case, the drawing section 155 of the decoding device 41 generates a texture image and a depth image from a virtual point of view based on the virtual camera and supplies them to the display device 42. The display device 42 three-dimensionally displays a display image on the basis of the acquired texture image and depth image.

3. Application Example

Configuration Example of Computer

While the series of processes described above can be executed by hardware, it may otherwise be executed by software. In the case where the series of processes is executed by software, a program that constructs the software is installed into a computer. The computer here includes a computer that incorporated in hardware for exclusive use, a personal computer, for example, for universal use that can execute various functions by installing various programs into the personal computer and so forth.

Figure 29:
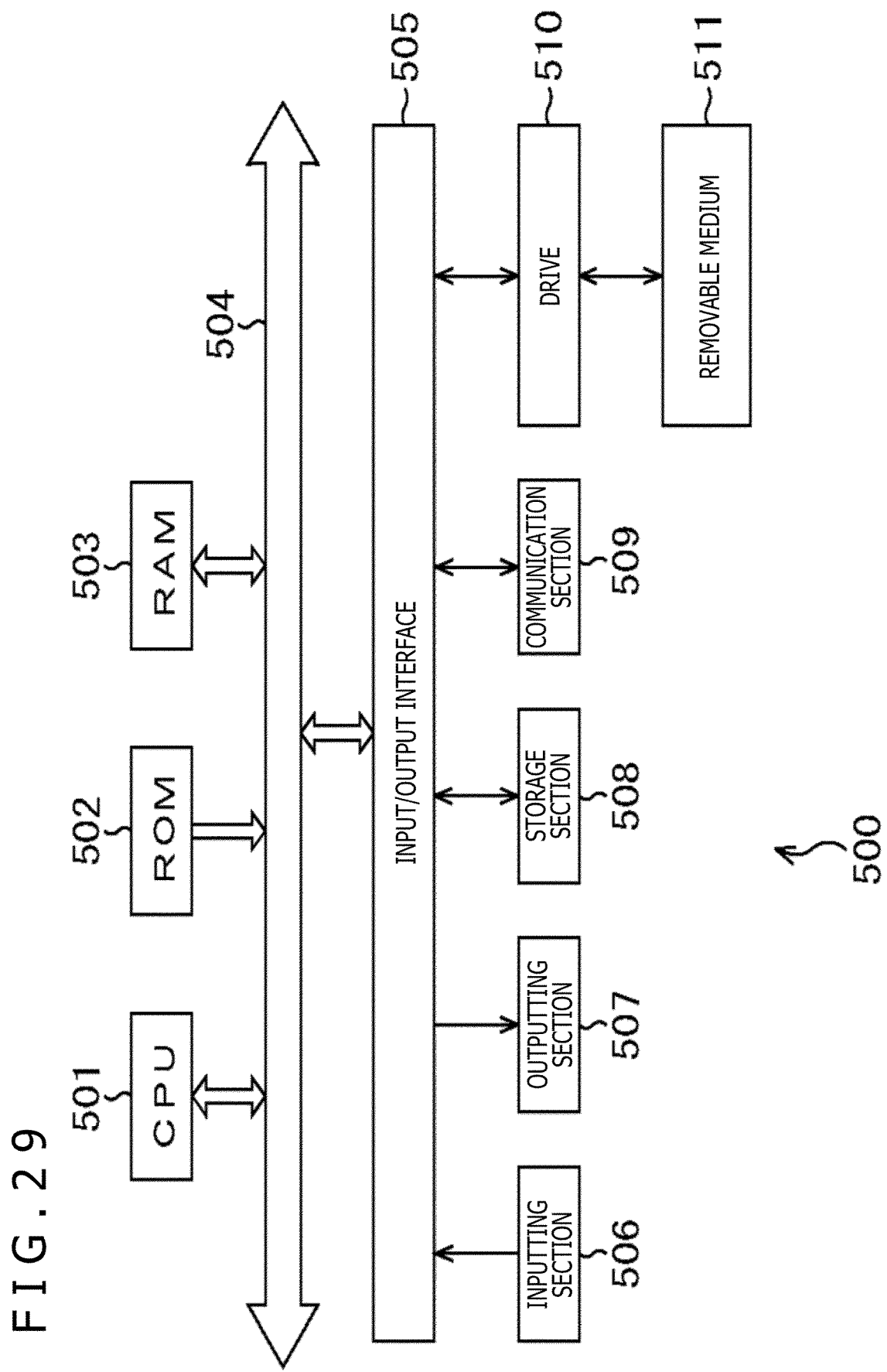
FIG. 29 is a block diagram depicting a configuration example of hardware of a computer.

FIG. 29 is a block diagram depicting an example of a hardware configuration of a computer that executes the series of processes described hereinabove in accordance with a program.

In the computer, a CPU (Central Processing Unit) 501, a ROM (Read Only Memory) 502, and a RAM (Random Access Memory) 503 are connected to one another by a bus 504.

Further, an input/output interface 505 is connected to the bus 504. An inputting section 506, an outputting section 507, a recording section 508, a communication section 509, and a drive 510 are connected to the input/output interface 505.

The inputting section 506 includes input switches, buttons, a microphone, an imaging element and so forth. The outputting section 507 includes a display, a speaker and so forth. The recording section 508 includes a hard disk, a nonvolatile memory or the like. The communication section 509 includes a network interface and so forth. The drive 510 drives a removable recording medium 511 such as a magnetic disk, an optical disk, a magneto-optical disk, a semiconductor memory or the like.

In the computer configured in such a manner as described above, the CPU 501 loads a program recorded, for example, in the recording section 508 into the RAM 503 through the input/output interface 505 and the bus 504 and executes the program to perform the series of processes described above.

The program to be executed by the computer (CPU 501) can be recorded on and provided as a removable recording medium 511, for example, as a package medium or the like. Otherwise, the program can be provided through a wired or wireless transmission medium such as a local area network, the Internet, or a digital broadcast.

The computer can install the program into the recording section 508 through the input/output interface 505 by loading the removable recording medium 511 into the drive 510. Further, the program can be received by the communication section 509 through a wired or wireless transmission medium and installed into the recording section 508. Also it is possible to install the program in advance in the ROM 502 or the recording section 508.

It is to be noted that the program to be executed by the computer may be of the type by which the processes are carried out in a time series in the order as described in the present specification or of the type by which the processes are executed in parallel or executed individually at necessary timings such as when the process is called.

Application Example to Vehicle Control System

Further, for example, the technology according to the present disclosure may be implemented as an apparatus that is incorporated in any type of moving body such as an automobile, an electric car, a hybrid electric car, a motorcycle, a bicycle, a personal mobility, an airplane, a drone, a ship, a robot, a construction machine, an agricultural machine (tractor) and so forth.

Figure 30:
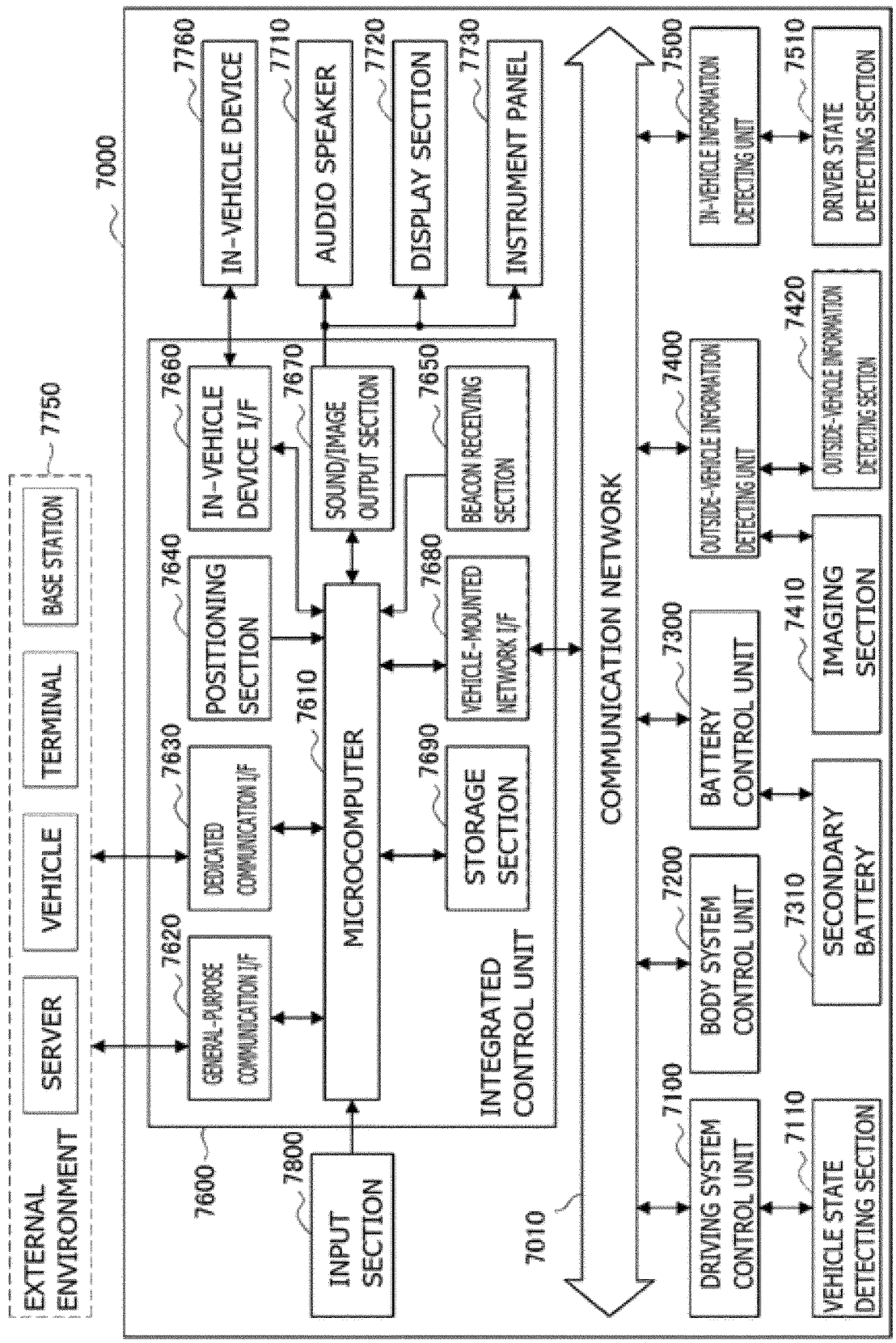
FIG. 30 is a block diagram depicting an example of schematic configuration of a vehicle control system.

FIG. 30 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 30, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 30 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 31:
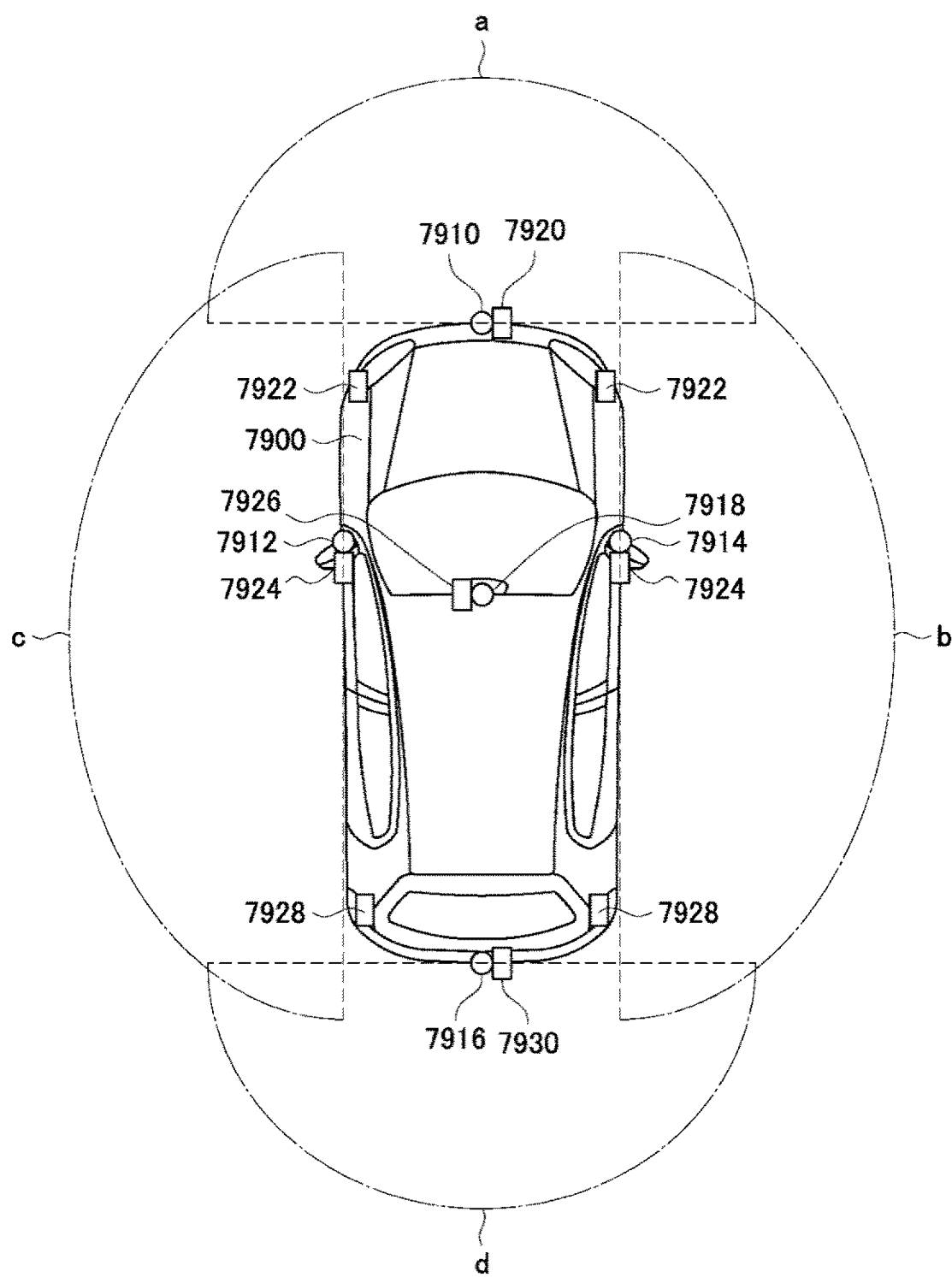
FIG. 31 is a diagram of assistance in explaining an example of installation positions of an outside-vehicle information detecting section and an imaging section.

FIG. 31 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 31 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 30, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 30, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 30 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the imaging section 21 according to the present embodiment described hereinabove with reference to FIG. 1 can be applied, for example, to the imaging section 7410 of the application example depicted in FIG. 30. The encoding device 23 of FIG. 1 can be applied at least to part of the outside-vehicle information detecting unit 7400 and the microcomputer 7610 of FIG. 30. The decoding device 41 of FIG. 1 can be applied, for example, at least to part of the outside-vehicle information detecting unit 7400, the microcomputer 7610, and the sound/image output section 7670 of FIG. 30. This makes it possible, for example, to display an image of an arbitrary point of view around the vehicle and reduce the load relating to processing and the transmission amount of data in the vehicle control system 7000.

In the present specification, the term system is used to signify an aggregation of a plurality of constituent elements (devices, modules (parts) and so forth) and it does not matter whether or not all of the constituent elements are accommodated in the same housing. Accordingly, a plurality of apparatus accommodated in separate housings and connected to each other through a network configure a system, and also one apparatus that includes a plurality of modules accommodated in a single housing configures a system.

It is to be noted that the advantageous effects described in the present specification are exemplary to the last and other advantageous effects may be demonstrated.

Further, the embodiment of the present technology is not limited to the embodiment described hereinabove and can be altered in various manners without departing from the subject matter of the present technology.

For example, the present technology can assume a configuration of cloud computing in which one function is shared and cooperatively executed by a plurality of apparatus through a network.

Further, the steps described hereinabove with reference to the flow charts not only can be executed by a single apparatus but also can be shared and executed by a plurality of apparatus.

Furthermore, in the case where a plurality of processes is included in one step, the plurality of processes included in the one step not only can be executed by a single apparatus but also can be shared and executed by a plurality of apparatus.

It is to be noted that the present technology can assume such configurations as described above.

(1)

An image processing apparatus, including:

a segmentation section configured to generate, for a plurality of point-of-view images of an object from a plurality of points of view, a plurality of segmentation images each of which is narrowed to a region that includes the object.

(2)

The image processing apparatus according to (1) above, in which the segmentation images are used for generation of a virtual image that is an image of the object from a virtual point of view.

(3)

The image processing apparatus according to (2) above, further including:

a selection section configured to select a plurality of reproducing images to be used for generation of the virtual image from among a plurality of the segmentation images.

(4)

The image processing apparatus according to (3) above, further including:

a packing section configured to generate a packing image by uniting a plurality of the reproducing images into one image.

(5)

The image processing apparatus according to (4) above, in which the packing section maps the reproducing images to a plurality of packing regions into which a region of a rectangular shape same as that of the packing image are divided and scales the reproducing images individually in accordance with a size of the packing regions.

(6)

The image processing apparatus according to (5) above, in which the packing section selects the packing region to which each of the reproducing images is to be mapped based on importance degrees of the reproducing images.

(7)

The image processing apparatus according to (5) or (6) above, in which the packing section generates metadata indicative of a position to which each of the reproducing images is mapped.

(8)

The image processing apparatus according to any one of (4) to (7) above, further including:

an encoding section configured to encode the packing image.

(9)

The image processing apparatus according to any one of (3) to (8) above, in which the selection section performs selection of the reproducing image based on a relative relationship in at least one of a position or a direction between each of the plurality of points of view and the virtual point of view.

(10)

The image processing apparatus according to (9) above, in which the selection section performs the selection of the reproducing image further based on a substance of the segmentation images.

(11)

The image processing apparatus according to (2) above, further including:

a selection section configured to select the plurality of point-of-view images to be used for generation of the virtual image from among a plurality of the point-of-view images, in which the segmentation section generates the segmentation image from each of the selected point-of-view images.

(12)

The image processing apparatus according to (1) above, further including:

a packing section configured to generate a packing image by uniting a plurality of the segmentation images into one image.

(13)

The image processing apparatus according to any one of (1) to (12) above, in which the segmentation section generates metadata indicative of a position of a region used in each of the segmentation images in each of the point-of-view images.

(14)

The image processing apparatus according to any one of (1) to (13) above, in which the segmentation section sets a region to be used for the segmentation image based on a region in which a 3D model or a three-dimensional space including the object in a 3D model generated from a plurality of the point-of-view images is projected to a coordinate system of each of the point-of-view images.

(15)

The image processing apparatus according to any one of (1) to (14) above, in which the segmentation section sets, for each of the plurality of points of view, a common region in which the object is included in a plurality of frames as a region to be used for the segmentation image.

(16)

The image processing apparatus according to any one of (1) to (15) above, in which each of the point-of-view images includes a texture image and a depth image; and each of the segmentation images includes an image generated from the texture image and an image generated from the depth images.

(17)

The image processing apparatus according to any one of (1) to (16) above, in which the point-of-view images include images captured from the plurality of points of view by a plurality of imaging devices.

(18)

An image processing method, including:

a segmentation step of generating, for a plurality of point-of-view images of an object from a plurality of points of view, a plurality of segmentation images each of which is narrowed to a region that includes the object.

(19)

An image processing apparatus, including:

a drawing section configured to generate, for a plurality of point-of-view images of an object from a plurality of points of view, a virtual image that is an image of the object from a virtual point of view based on a plurality of segmentation images each of which is narrowed to a region that includes an object.

(20)

An image processing method, including:

a drawing step of generating, for a plurality of point-of-view images of an object from a plurality of points of view, a virtual image that is an image of the object from a virtual point of view based on a plurality of segmentation images each of which is narrowed to a region that includes an object.

REFERENCE SIGNS LIST

10 Image processing system, 11 Data supplying section, 12 Reproduction section, 13 Inputting device, 21 Imaging section, 23 Encoding device, 41 Decoding device, 42 Display device, 31-1 to 31-N Imaging camera, 101 Reconstruction section, 102 Segmentation section, 103 Selection section, 104 Packing section, 105 Encoding section, 107 Transmission section, 111 Foreground region detection section, 112 Segmentation image generation section, 121 Importance degree setting section, 122 Reproducing data selection section, 131 Packing image generation section, 132 Metadata generation section, 151 Reception section, 153 Decoding section, 154 Reconstruction section, 155 Drawing section

The invention claimed is:

1. An image processing apparatus, comprising:

a segmentation section configured to generate, for a plurality of point-of-view images of an object from a plurality of points of view, a plurality of segmentation images, each segmentation image of the plurality of segmentation images being narrowed to a region that includes the object, and set, for each point of view of the plurality of points of view, the region to be used for a corresponding segmentation image based on a region in which a 3D model or a three-dimensional space including the object in a 3D model generated from the plurality of point-of-view images is projected to a coordinate system of a corresponding point-of-view image of the plurality of point-of-view images; and a packing section configured to generate a packing image by uniting a plurality of reproducing images into one image, map the plurality of reproducing images to a plurality of packing regions, and select a corresponding packing region of the plurality of packing regions to which each reproducing image of the plurality of reproducing images is to be mapped based on importance degrees of the plurality of reproducing images, wherein a first packing region of the plurality of packing regions, to which a first reproducing image of the plurality of reproducing images having a first importance degree is mapped, has a first size, wherein a second packing region, to which a second reproducing image of the plurality of reproducing images having a second importance degree is mapped, has a second size, wherein the first size is greater than the second size and the first importance degree is greater than the second importance degree, and wherein the segmentation section and the packing section are each implemented via at least one processor.

2. The image processing apparatus according to claim 1, wherein
the plurality of segmentation images are used for generation of a virtual image that is an image of the object from a virtual point of view.

3. The image processing apparatus according to claim 2, further comprising:
a selection section configured to select the plurality of reproducing images to be used for generation of the virtual image from among the plurality of the segmentation images,
wherein the selection section is implemented via at least one processor.

4. The image processing apparatus according to claim 1, wherein
the packing section is further configured to
map the reproducing images to the plurality of packing regions into which a region of a rectangular shape same as that of the packing image are divided, and
scale the plurality of reproducing images individually in accordance with a size of the packing regions.

5. The image processing apparatus according to claim 4, wherein
the packing section is further configured to generate metadata indicative of a position to which each reproducing image of the plurality of reproducing images is mapped.

6. The image processing apparatus according to claim 1, further comprising:
an encoding section configured to encode the packing image,
wherein the encoding section is implemented via at least one processor.

7. The image processing apparatus according to claim 3, wherein
the selection section is further configured to perform selection of the plurality of reproducing images based on a relative relationship in at least one of a position or a direction between each of the plurality of points of view and the virtual point of view.

8. The image processing apparatus according to claim 7, wherein
the selection section is further configured to perform the selection of the plurality of reproducing images further based on a substance of the segmentation images.

9. The image processing apparatus according to claim 2, further comprising:
a selection section configured to select the plurality of point-of-view images to be used for generation of the virtual image from among a plurality of the point-of-view images, wherein
the segmentation section is further configured to generate the plurality of segmentation images from each of the selected plurality of point-of-view images, and
wherein the selection section is implemented via at least one processor.

10. The image processing apparatus according to claim 1, wherein
the segmentation section is further configured to generate metadata indicative of a position of a region used in each segmentation image of the plurality of segmentation images in each point-of-view image of the plurality of point-of-view images.

11. The image processing apparatus according to claim 1, wherein
the segmentation section is further configured to set, for each point of view of the plurality of points of view, a common region in which the object is included in a plurality of frames as a region to be used for the plurality of segmentation images.

12. The image processing apparatus according to claim 1, wherein
each point-of-view image of the plurality of point-of-view images includes a texture image and a depth image; and
each segmentation image of the plurality of segmentation images includes an image generated from the texture image and an image generated from the depth images.

13. The image processing apparatus according to claim 1, wherein
the plurality of point-of-view images include images captured from the plurality of points of view by a plurality of imaging devices.

14. The image processing apparatus according to claim 1, wherein the 3D model is a foreground 3D model and the three-dimensional space is a foreground three-dimensional space, and
wherein the segmentation section
determines, for each segmentation image of the plurality of segmentation images, a rectangular bounding box for the region in which the 3D model or a three-dimensional space including the object in the 3D model generated from the plurality of the point-of-view images is projected to the coordinate system of the corresponding point-of-view image of the plurality of point-of-view images, and
sets the determined bounding box as the region to be used for the corresponding segmentation image.

15. An image processing method, comprising:
generating, for a plurality of point-of-view images of an object from a plurality of points of view, a plurality of segmentation images, each segmentation image of the plurality of segmentation images being narrowed to a region that includes the object;
setting, for each point of view of the plurality of points of view, the region to be used for a corresponding segmentation image based on a region in which a 3D model generated from the plurality of the point-of-view images is projected to a coordinate system of a corresponding point of view image of the plurality of point-of-view images;
generating a packing image by uniting a plurality of reproducing images into one image;
mapping the plurality of reproducing images to a plurality of packing regions; and selecting a corresponding packing region of the plurality of packing regions to which each reproducing image of the plurality of reproducing images is to be mapped based on importance degrees of the plurality of reproducing images, wherein a first packing region of the plurality of packing regions, to which a first reproducing image of the plurality of reproducing images having a first importance degree is mapped, has a first size, wherein a second packing region, to which a second reproducing image of the plurality of reproducing images having a second importance degree is mapped, has a second size, and wherein the first size is greater than the second size and the first importance degree is greater than the second importance degree.

16. A non-transitory computer-readable medium having embodied thereon a program, which when executed by a computer causes the computer to execute an image processing method, the method comprising:

generating, for a plurality of point-of-view images of an object from a plurality of points of view, a plurality of segmentation images, each segmentation image of the plurality of segmentation images being narrowed to a region that includes the object;

setting, for each point of view of the plurality of points of view, the region to be used for a corresponding segmentation image based on a region in which a 3D model generated from the plurality of point-of-view images is projected to a coordinate system of a corresponding point of view image of the plurality of point-of-view images;

generating a packing image by uniting a plurality of reproducing images into one image;

mapping the plurality of reproducing images to a plurality of packing regions; and selecting a corresponding packing region of the plurality of packing regions to which each reproducing image of the plurality of reproducing images is to be mapped based on importance degrees of the plurality of reproducing images, wherein a first packing region of the plurality of packing regions, to which a first reproducing image of the plurality of reproducing images having a first importance degree is mapped, has a first size, wherein a second packing region, to which a second reproducing image of the plurality of reproducing images having a second importance degree is mapped, has a second size, and wherein the first size is greater than the second size and the first importance degree is greater than the second importance degree.

* * * * *